(12) United States Patent
Bhupati et al.

(10) Patent No.: US 11,301,232 B2
(45) Date of Patent: Apr. 12, 2022

(54) UPDATE MANAGEMENT SERVICE FOR ENTERPRISE COMPUTING ENVIRONMENTS

(71) Applicant: MICROSOFT TECHNOLOGY LICENSING, LLC, Redmond, WA (US)

(72) Inventors: Dhirendra Kumar Bhupati, Sammamish, WA (US); Yuanbo Guo, Redmond, WA (US); Shashidhar Rajashekara, Sammamish, WA (US); Dicheng Wu, Bellevue, WA (US); Tak Wing Ng, Bellevue, WA (US); Madhavilatha Kaniganti, Sammamish, WA (US); Xin Zhou, Issaquah, WA (US); Amesh Shewak Mansukhani, Kirkland, WA (US); Sundararajan Subramanian, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 359 days.

(21) Appl. No.: 16/425,683

(22) Filed: May 29, 2019

(65) Prior Publication Data

US 2020/0379744 A1 Dec. 3, 2020

(51) Int. Cl.
*G06F 8/65* (2018.01)
*G06F 11/07* (2006.01)

(52) U.S. Cl.
CPC .............. *G06F 8/65* (2013.01); *G06F 11/076* (2013.01); *G06F 11/0709* (2013.01); *G06F 11/0793* (2013.01)

(58) Field of Classification Search
CPC .............. G06F 11/0709; G06F 11/076; G06F 11/0793; G06F 8/65
See application file for complete search history.

(56) References Cited

U.S. PATENT DOCUMENTS 6,966,059 B1  11/2005  Shetty et al.
7,633,869 B1 * 12/2009  Morris ................ H04L 41/0896
                                                        370/232

(Continued)

FOREIGN PATENT DOCUMENTS

CN       101662533 A    3/2010
WO         0036503 A2    6/2000

OTHER PUBLICATIONS

"Deploying and updating Microsoft Office 365 ProPlus", Retrieved from: https://www.microsoft.com/en-us/itshowcase/deploying-and-updating-microsoft-office-365-proplus, Jan. 28, 2019, 9 Pages.

(Continued)

*Primary Examiner* — Matthew M Kim
*Assistant Examiner* — Matthew N Putaraksa
(74) *Attorney, Agent, or Firm* — NovoTechIP International PLLC

(57) ABSTRACT

A system and method for management of updates across a plurality of enterprise computing devices. The system is configured to receive telemetry about the enterprise computing devices that will be used to develop a rollout strategy for upcoming updates. The system provides IT administrators with a user interface for modifying and customizing the rollout strategy. The proposed system and method can significantly improve the efficiency of regular update deployments to enterprise computing devices, and reduce the network cost associated with such deployments.

18 Claims, 22 Drawing Sheets

(56) References Cited

U.S. PATENT DOCUMENTS

| | | |
|---|---|---|
| 7,996,814 B1 | 8/2011 | Qureshi et al. |
| 9,229,902 B1 | 1/2016 | Leis et al. |
| 9,331,914 B2 | 5/2016 | Thyni et al. |
| 9,916,150 B2* | 3/2018 | Gbadegesin .......... H04L 67/125 |
| 10,567,417 B1* | 2/2020 | Dinning .................. G06F 16/21 |
| 2002/0078223 A1* | 6/2002 | Baldonado ............. H04L 47/10 709/232 |
| 2006/0080656 A1* | 4/2006 | Cain ........................ G06F 8/65 717/174 |
| 2006/0130037 A1 | 6/2006 | Mackay |
| 2007/0091921 A1 | 4/2007 | Elliot et al. |
| 2012/0210310 A1* | 8/2012 | Cooley ..................... G06F 8/65 717/168 |
| 2012/0331460 A1* | 12/2012 | Manahan .................. G06F 8/61 717/178 |
| 2014/0245280 A1* | 8/2014 | Chen ....................... G06F 8/654 717/171 |
| 2014/0298091 A1* | 10/2014 | Carlen ...................... G06F 9/54 714/15 |
| 2016/0306618 A1* | 10/2016 | Bansod ..................... G06F 8/65 |
| 2016/0328264 A1* | 11/2016 | Sparapani ........ G06Q 10/06312 |
| 2018/0032324 A1* | 2/2018 | Sarkar ....................... G06F 8/65 |
| 2018/0081670 A1* | 3/2018 | Caushi .................... H04L 67/34 |
| 2018/0300180 A1 | 10/2018 | Shepard et al. |
| 2018/0349130 A1* | 12/2018 | Mohammed .......... H04L 67/322 |
| 2019/0018394 A1* | 1/2019 | Sayyarrodsari .... G06Q 10/0833 |
| 2019/0220036 A1* | 7/2019 | Weslosky ................. G07C 5/08 |
| 2019/0303127 A1* | 10/2019 | Krishnaswamy ......... G06F 8/60 |
| 2019/0332370 A1* | 10/2019 | Christiansen ......... G06F 9/5016 |
| 2019/0356499 A1* | 11/2019 | Demonsant ........... H04L 51/046 |
| 2020/0267437 A1* | 8/2020 | Pantos ............... H04N 21/4621 |
| 2020/0348923 A1* | 11/2020 | Mezaael ................. H04W 4/40 |
| 2021/0072968 A1* | 3/2021 | Mezaael ................... G06F 8/65 |

OTHER PUBLICATIONS

Brinkmann, Martin, "Windows 10 Update Delivery Optimization explained", Retrieved from: https://web.archive.org/web/20161110094241/https://www.ghacks.net/2016/08/17/windows-10-update-delivery-optimization/, Aug. 17, 2016, 6 Pages.

"International Search Report and Written Opinion Issued in PCT Application No. PCT/US2020/029029", dated Jul. 13, 2020, 13 Pages.

* cited by examiner

Dashboard / Low risk devices profile

Low risk devices profile ← 1310
Network rollout strategy
Feature update: Limit download size to 5G per day
Quality and security update: Limit download size to 5G per day  Edit ← 1302

Rollout detail

Payload/network distribution — 1320

Payload/network distribution — 1330 — Projected and realtime rollout rings
☐ Projected devices  ▨ Updated devices  ▨ Failed updates

| Payload | | |
|---|---|---|
| High | | ◯ |
| Med | ◯ ←1322 | |
| Low | ◯ | ◯ |
| | Low  Med  High | |
| | Network bandwidth | |

Chart (1332):
5K
4K
3K
2K
0
Ring 1     Ring 6
Apr 25     May 5

Rollout info and progress ← 1340
Update window: 10 days
Estimated finish time: May 5
Updated devices: 0 of 12,349
Bits downloaded so far: 0

Profile details
No alerts ← 1350

Recommendations ← 1360
- 50 devices can benefit from delivery optimization
- Lorem ipsum

[ Learn More ]

FIG. 13

Dashboard / Low risk devices profile

Low risk devices profile ← 1310
Network rollout strategy
Feature update: Limit download size to 5G per day | Quality
and security update: Complete 20% of devices in 10 day    Edit ← 1302

Rollout detail

Payload/network distribution | Projected and realtime ← 1330 | Rollout info ← 1340
rollout rings | and progress
□ Projected ▨ Updated ▨ Failed | Update window
devices   devices    updates | 10 days
— 1332 | Estimated finish time:
May 5
Updated devices
0 of 12,349
Bits downloaded so far
0

Payload: High / Med / Low
1422, 1322
Low Med High
Network bandwidth 5K, 4K, 3K, 2K, 0
Ring 1         Ring 6
Apr 25        May 5
— 1342

1320, 1360, 1350

Profile details
No alerts

Recommendations
⊕ 50 devices can benefit from delivery optimization
⊕ Lorem ipsum Learn More 1300, 1302

FIG. 14

UPDATE MANAGEMENT SERVICE FOR ENTERPRISE COMPUTING ENVIRONMENTS

BACKGROUND

To perform computing tasks, computer systems run software. Software is continually evolving to include updated functionality, for example, to correct bugs, address security issues, add features, and simply to provide additional or enhanced features. At different times, a software developer can release updates to their software that include updated functionality and tools. Installing a software update typically requires an end-user to make user of or more updaters that can make use of network connectivity to determine when updates are available. Some updaters automatically alert users when updates are available. Other updaters can assist users in determining whether updates are available when so desired. When an update is made available, the user can select the update and the updater can help the user install the update for the user.

With respect to enterprise computing system comprising a large number of individual client computing devices, the management of update installations or other software components can be difficult to monitor, as well as time-consuming. An administrator may be required to identify a number of updates to install, manually formulate an installation plan (e.g., how to take down and bring up systems, determine a specified order for installing updates, etc.), and then install updates in accordance with the installation plan (e.g., take down and bring up systems, install updates in the specified order, etc.). Thus, there remain significant areas for new and improved ideas for managing software updates in a way that reduces the burden on end-users and network administrators, as well as provides options for efficiently scheduling and distributing the download payloads.

SUMMARY

An update management system for enterprise computing devices, in accord with a first aspect of this disclosure, includes a processor and computer readable media including instructions which, when executed by the processor, cause the processor to receive a first plurality of telemetry messages over a communication network, each telemetry message of the first plurality of telemetry messages conveying telemetry for each of a first plurality of enterprise computing devices. The instructions also cause the processor to assign each of the first plurality of enterprise computing devices to one of a plurality of partitions based on at least a network address associated with the enterprise computing device, the plurality of partitions including a first partition, and assign a priority level to each of the first plurality of enterprise computing devices within its respective one of the plurality of partitions based on at least a telemetry message received for that enterprise computing device. The instructions further cause the processor to cause, as part of a rollout of an update to the first plurality of enterprise computing devices, the update to be deployed to a second plurality of enterprise computing devices, wherein the second plurality of enterprise computing devices are selected from the first plurality of enterprise computing devices assigned to the first partition according to the priority level assigned to the second plurality of enterprise computing devices within the first partition.

A method for managing updates for an enterprise computing environment, in accord with a second aspect of this disclosure, includes receiving a first plurality of telemetry messages over a communication network, each telemetry message of the first plurality of telemetry messages conveying telemetry for each of a first plurality of enterprise computing devices, as well as assigning each of the first plurality of enterprise computing devices to one of a plurality of partitions based on at least a network address associated with the enterprise computing device, the plurality of partitions including a first partition. The method further includes assigning a priority level to each of the first plurality of enterprise computing devices within its respective one of the plurality of partitions based on at least a telemetry message received for that enterprise computing device. In addition, the method includes causing, as part of a rollout of an update to the first plurality of enterprise computing devices, the update to be deployed to a second plurality of enterprise computing devices, wherein the second plurality of enterprise computing devices are selected from the first plurality of enterprise computing devices assigned to the first partition according to the priority level assigned to the second plurality of enterprise computing devices within the first partition.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 13 and 14 are representations of a device display with an implementation of an update profile management interface at a time prior to an update rollout;

DETAILED DESCRIPTION

Figure 1A:
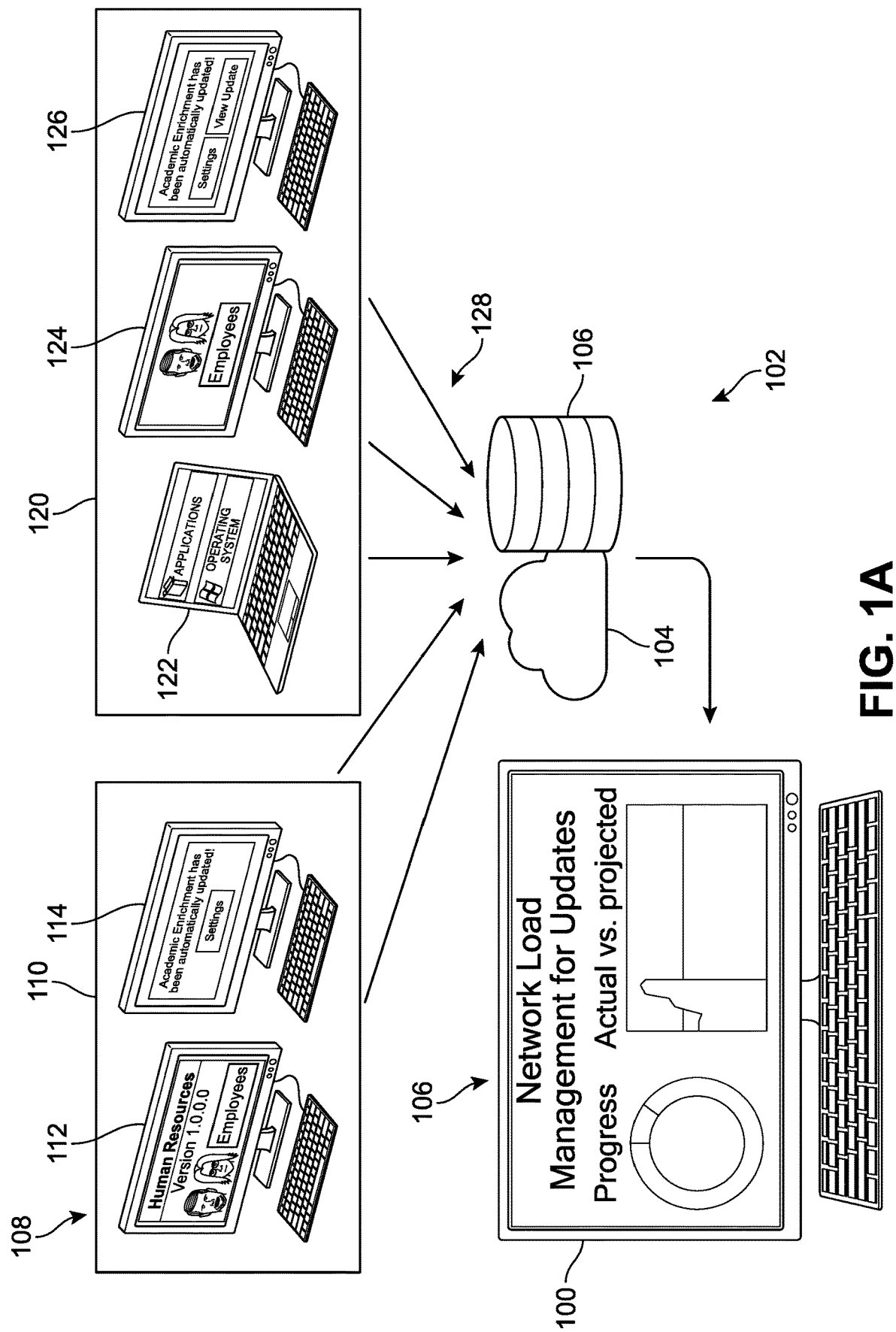
FIG. 1A is a conceptual illustration of an implementation of an update management service for an enterprise computing environment and FIG. 1B is an implementation of a user interface for managing the updates.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Devices that run software may usually require updates over time. The need for software updates may be driven by many factors, such as addressing bugs, adding new functionality, improving performance, maintaining compatibility with other software, and so forth. While many techniques have been used for updating software, an update typically involves changing the source code of a program, compiling the program, and distributing the program to devices where the updated program will be executed. The following description discloses systems and methods for management of updates across a large number of enterprise-based computing devices in a way that minimizes the potential impact of these updates on the enterprise network. Administrators will be provided with an easy to use interface and system by which they may easily manage and keep abreast of frequent updates while designing a download delivery schedule that promotes the health of their network. The system is configured to receive telemetry signals from enterprise client devices to generate an improved roll-out strategy to guide the administrators and offer a straightforward mechanism by which to deliver the updates to their end-users and meet their organizational requirements.

As a general matter, the terms "cloud computing service" or "cloud service" generally refers to one or more computing resources provided over a computer network such as the Internet by a remote computing facility. Example cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

In addition, an "upgrade" generally refers to a process of replacing an OS, software, or firmware product (or a component thereof) with a newer version of the same product in order to correct software bugs, improve device performance, introduce new functionalities, or otherwise improve characteristics of the software product. In one example, an upgrade can include a software patch to an operating system or a new version of the operating system. Various resources stored on client computing devices can involve one-time, periodic, or occasional upgrades in software, firmware, device drivers, etc. In contrast, an "update" generally refers to a process of modifying already existing software applications.

For purposes of reference, an update management system (UMS) refers to a system by which a user can access software updates, as well as perform a variety of update content management tasks, such as retrieve, modify, browse, and/or share the update content items, and enable a user to monitor the update activities. Generally, a user can interact with a UMS through one or more client devices that are connected to a network. A UMS can support connections from a variety of different client devices, such as desktop computers, mobile computers, mobile communications devices (such as mobile phones, smart phones, tablets, etc.), smart televisions, gaming devices, set-top boxes, and/or any other network enabled computing devices. A UMS can be configured to accept connections from and interact with multiple client devices concurrently. Typically, a user engages with a UMS through interaction with a client-side application that is installed on the client's device, or via a third-party application, such as a web-browser application, and is configured to communicate with the UMS.

Furthermore, the terms "software program", "software application", "program", "software", or "application" may be understood refer to a computer program that performs useful work, generally unrelated to the computer itself. Some non-limiting examples of software applications include word processors, spreadsheets, accounting systems, and telecommunication programs, as well as gaming software, utility and productivity tools, mobile applications, presentation graphics, and other productivity software. Specific references to a software application by name throughout this description should not therefore be understood to limit the use of the proposed systems and methods. In addition, synchronization can refer to an automated process by which one or more software programs are updated in association with an OS upgrade in response to a determination that the current version of the one or more software programs would be incompatible or otherwise perform at a diminished level as a result of the forthcoming or imminent OS upgrade.

Figure 1B:
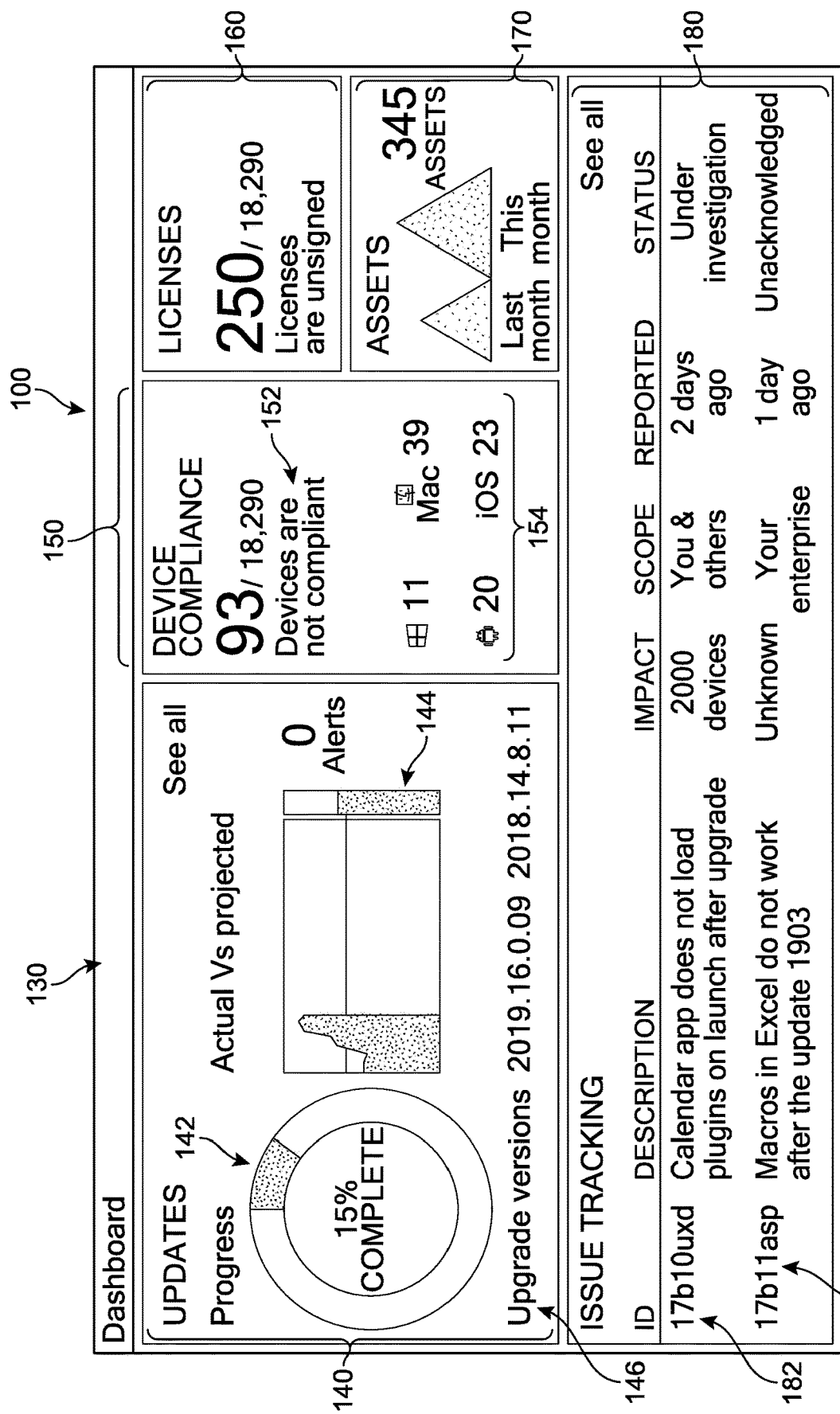
Figure 3A:
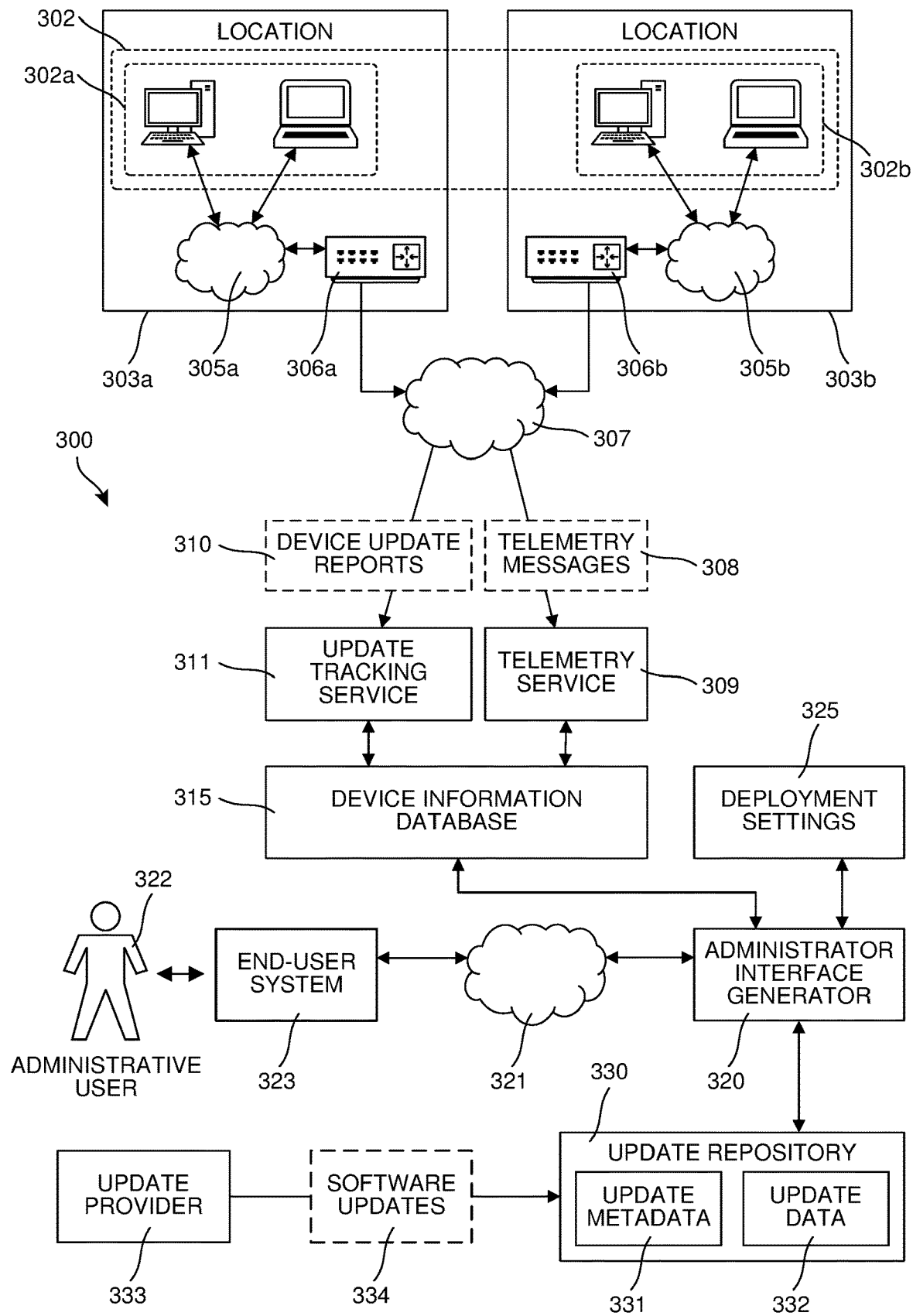
FIGS. 3A-3C is a schematic illustration of an implementation of an update management system.
Figure 3B:
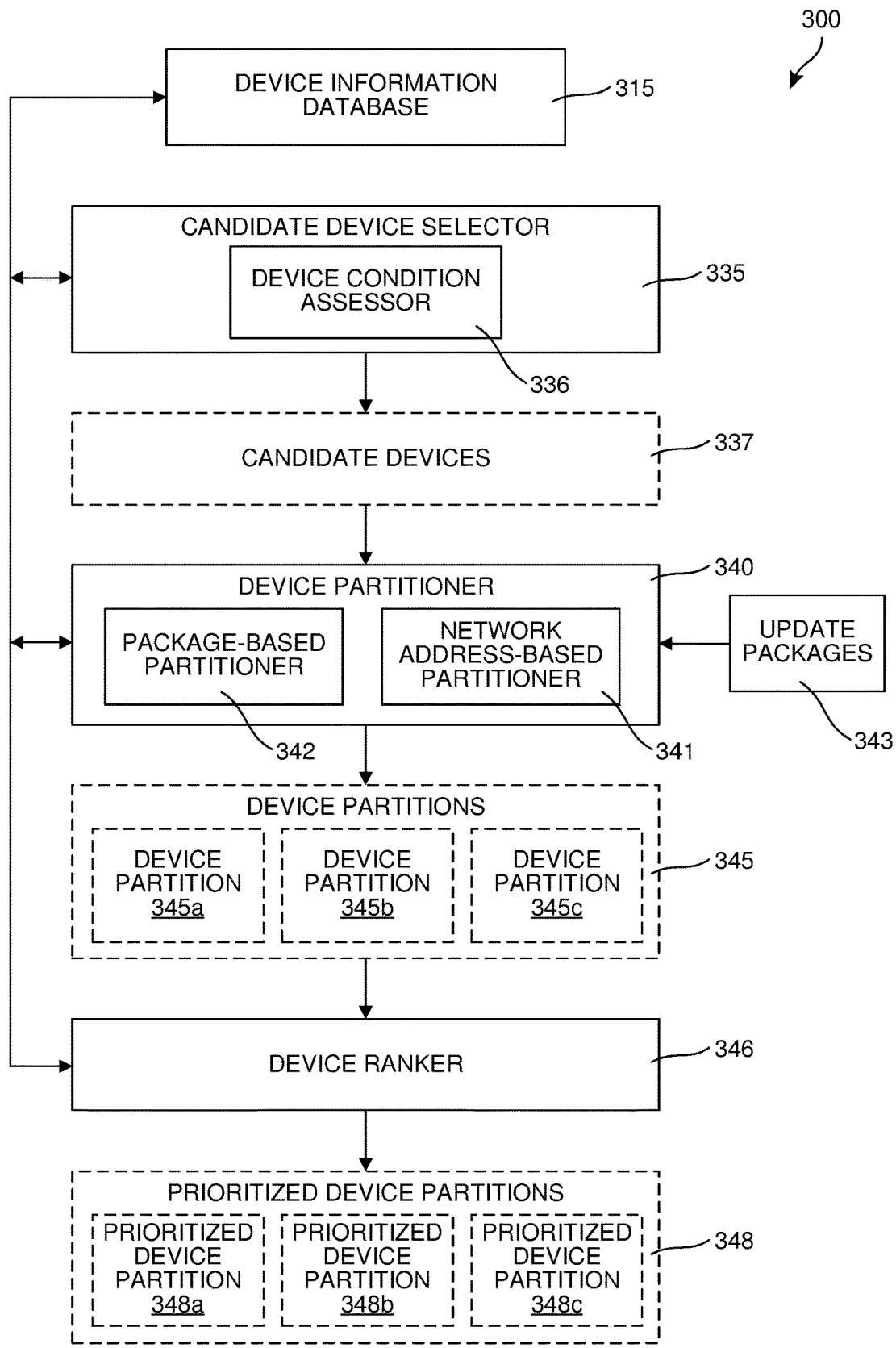
Figure 3C:
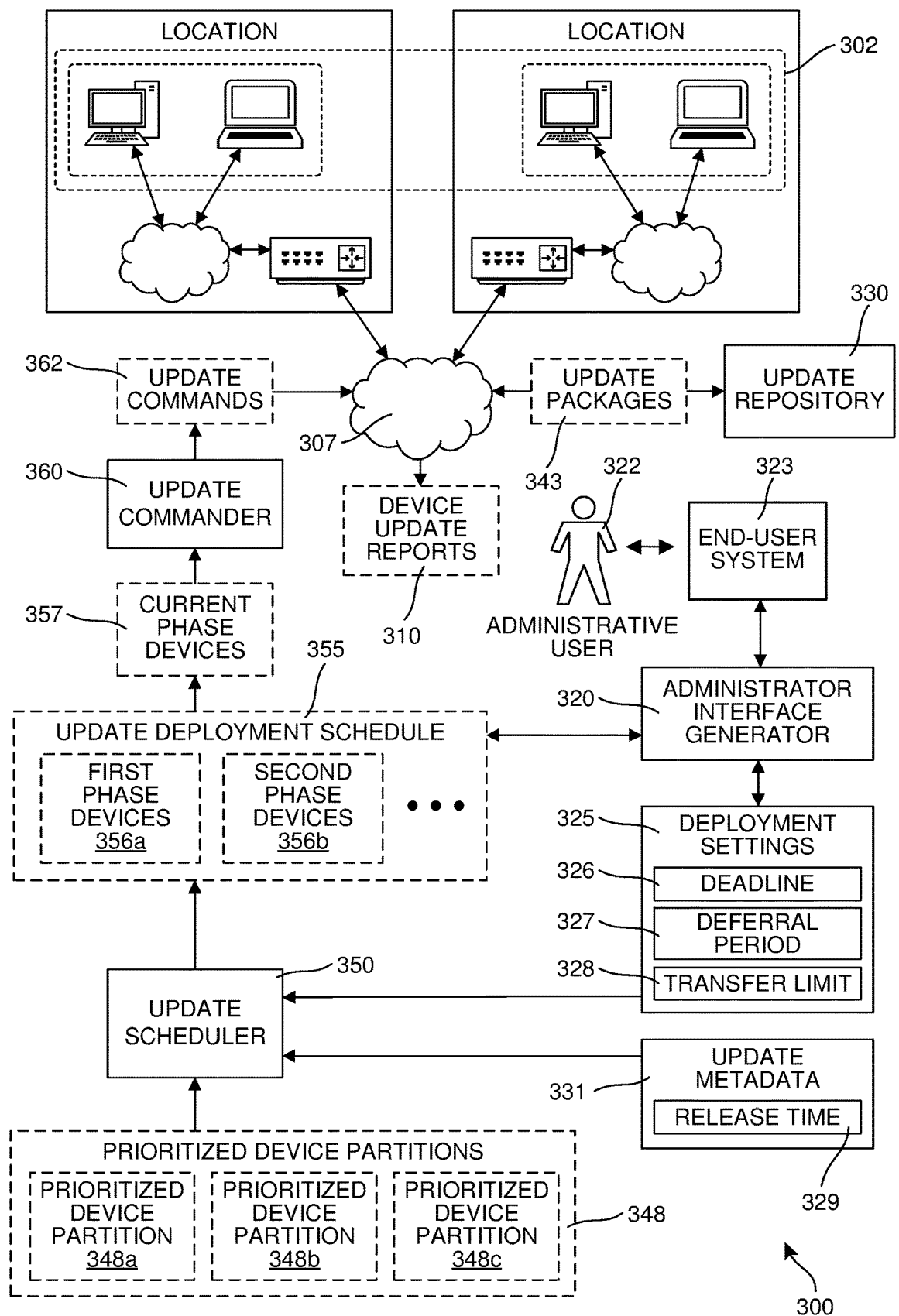

In order to better introduce the systems and methods to the reader, FIG. 1A presents a high-level example of a representative computing environment ("environment") for implementing an electronic content synchronization management system (illustrated schematically in FIGS. 3A-3C). In different implementations, the environment can include an enterprise computing system with one or more client computing devices, or simply "devices". One or more devices can send and/or receive information via a computing network. The various features and activities illustrated in FIGS. 1A and 1B are described generally, with further details and examples presented in connection with later figures.

Referring to FIG. 1A, one example of an enterprise computing architecture ("architecture") 102 is shown. The architecture 102 may include a plurality of client devices 108 and a system administrator server ("server") 106 communicatively connected, for example via an interconnect or network 104. Client devices 108 may be any type of electronic device capable of executing programmable instructions such as, but not limited to, a mobile device, a personal digital assistant, a mobile client device, a smart phone, a cellular telephone, a handheld computer, a server, a server array or server farm, a web server, a network server, an Internet server, a work station, a mini-computer, a mainframe computer, a supercomputer, a network appliance, a web appliance, a distributed computing system, multiprocessor systems, a router, a gateway, or combination thereof.

The network 104 may be any type of communications link capable of facilitating communications between the client devices 108 and the system administrator server 106, utilizing any type of communications protocol and in any configuration, such as without limitation, a wired network, wireless network, or combination thereof. The network 104 may be a local area network (LAN), wide area network (WAN), intranet or the Internet operating in accordance with an appropriate communications protocol.

Furthermore, it can be understood that in some implementations, the client devices 108 can be in communication with the server 106 from different locations. In FIG. 1A, the client devices 108 include a first device 112 and a second device 114 associated with a first computing network address 110, and a third device 122, a fourth device 124, and an Nth device 126 associated with a second network address 120. Thus, in different implementations, two or more client devices of a single enterprise system or architecture can be associated with differing network addresses, or Nat IPs.

Furthermore, in different implementations, the architecture 102 can include traditional client-type devices, as well as desktop computer-type devices, mobile-type devices, special purpose-type devices, embedded-type devices, and/or wearable-type devices. As an example, the client computing devices can include computer navigation type client computing devices such as satellite-based navigation systems including global positioning system (GPS) devices and other satellite-based navigation system devices, telecommunication devices such as mobile phones, tablet computers, mobile phone tablet hybrid, personal data assistants (PDAs), laptop computers, other mobile computers, wearable computers, implanted computing devices, desktop computers, personal computers, automotive computers, network-enabled televisions, thin clients, terminals, game consoles, gaming devices, work stations, media players, personal video recorders (PVRs), television set-top boxes, digital video recorders (DVRs), cameras, integrated components for inclusion in a computing device, appliances, or any other sort of computing device configured to receive user input.

Generally, a system administrator may be one or more persons responsible for maintaining and supporting the enterprise computing system 102. The system administrator may employ a server (e.g., server 106) that is communicatively coupled to the client devices 108 via the network 104. The server 106 may host some of the services that are utilized by some or all of the client devices 108. In some implementations, the system administrator may create or receive an update deployment procedure that the system administrator may rely on during distribution of updates to some or all of the client devices 108. The update deployment procedure can be configured to identify events that are to be monitored, the devices where the events may occur, and the deployment-related action that should be employed when an event occurs. Each client device may include an update service and an operating system, as well as a connection to the network 104. The update service may be embodied as a program executed by the client device, and the operating system manages the resources provided by the client device. In some implementations, one or more of these computing devices can be configured to communicate via the network 104 with management service provider ("management service") 116 and transmit various telemetry signals 128 or otherwise report conditions or a status about the computing device and its performance, operations, and/or hardware and software components (see FIG. 3).

In different implementations, an update deployment procedure can be supervised and managed at server 106 via a network dashboard management application's user interface ("dashboard interface") 100. In general, an "interface" can be understood to refer to a mechanism for communicating content through a client application to an application user. For example, interfaces may include pop-up windows that may be presented to a user via native application user interfaces (UIs), controls, actuatable interfaces, interactive buttons, or other objects that may be shown to a user through native application UIs, as well as mechanisms that are native to a particular application for presenting associated content with those native controls. Furthermore, an "actuation" or "actuation event" refers to an event (or specific sequence of events) associated with a particular input or use of an application via an interface, which can trigger a change in the display of the application. Similarly, a 'targeted' option or target option refers to the option that is current navigation destination, without the target having been actuated. In other words, when a user moves their selection tool or navigational indicator from a first option or location of the interface to another, second option or location, it can be understood that the current target has switched from the first option to the second option.

In addition, a "native control" refers to a mechanism for communicating content through a client application to an application user. For example, native controls may include actuatable or selectable options or "buttons" that may be presented to a user via native application UIs, touch-screen access points, menus items, or other virtual objects that may be shown to a user through native application UIs or segments of a larger interface, as well as mechanisms that are native to a particular application for presenting associated content with those native controls. The term "asset" refers to content that may be presented in association with a native control in a native application. Thus, as non-limiting examples, an asset may include text in an actuatable pop-up window, audio associated with the interactive click or selection of a button or other native application object, video associated with a user interface, or other such information presentation.

As a general matter, references to a rollout, update rollout, or rolling deployment refer to a software release strategy that staggers deployment across multiple phases. In some cases, this can involve one or more servers performing one or more function within a server cluster, and/or a sequence of rollout phases that correspond to specific computing devices I the enterprise architecture. In other words, rather than updating all devices simultaneously, the organization installs the updated software package on one device or server (or subset of devices and/or servers) at a time. A rolling deployment can be used to reduce application downtime and unforeseen consequences or errors in software updates.

One implementation of the management dashboard interface 100 is introduced with reference now to FIG. 1B. In FIG. 1B, it can be seen that the dashboard interface 100 comprises a graphical UI (GUI) presenting a plurality of status notification panels ("notification panels") 130, here depicted in an overview or "Dashboard" for monitoring the general progress of system-wide updates. In this example, notification panels 130 include a first notification region 140, a second notification region 150, a third notification region 160, a fourth notification region 170, and a fifth notification region 180. In some implementations, one or more notifications or other displays of information can be presented that offer a 'big picture' sense of the broader update procedure context. In FIG. 1B, the first notification region 140 includes a pictorial depiction of the large-scale progress of updates, both as a general percent complete cycle 142 that is updated in real-time (here shown as 15%) for representing the completion status, as well as a projection graph 144 to represent the updates that are expected or scheduled to occur during the presently selected or occurring update cycle. A "See All" option is also offered to expand the information shown in first notification region 140 and view additional detail or options. A "0 Alerts" message conveys to the administrator that no alerts have been generated thus far. An "Upgrade versions" notice (2019.16.0.09 2018.14.8.11) also confirms for the administrator which specific upgrade event is being represented.

The second notification region 150 is configured to present information related to Device Compliance. In other words, devices that do not meet one or more compliance conditions will be identified and the total number shown here. In FIG. 1B, a notice 152 shows that there are 93 client computing devices out of 18,290 client computing devices of the enterprise system currently identified as "not compliant" and so cannot be upgraded. For further convenience of the end-user, the non-compliant devices are categorized or classified by device type in a breakdown 154; these include 11 Windows® devices, 39 Mac® devices, 20 Android™ devices, and 23 iOS® devices. This type of breakdown can facilitate the administrator's ability to quickly absorb the information and discern whether any patterns exist. Similarly, the third notification region 160 identifies how many client devices in the enterprise are unsigned ("250/18,290 licenses are unsigned") which can inform an administrator's decisions about certain types of updates or upgrades. The fourth notification region 170 includes information about how many new assets or computing devices have been added over a particular period of time (in this case "345 assets" that have been added between the last month and the current month). Finally, the fifth notification region 180 is configured to present information about aspects of the update cycle that may represent potential problems, or may simply be characteristics of the process that are out of the ordinary. In this case, the fifth notification region 180 includes a first issue 182 and a second issue 184. The first issue 182 includes an ID, a description ("Calendar does not load plugins on launch after upgrade"), Impact ("2000 devices"), Scope ("You and others"), Reported ("2 days ago"), and Status ("Under investigation"). The second issue 184 includes an ID, a description ("Macros in Excel do not work after the update 1903"), Impact ("Unknown"), Scope ("Your enterprise"), Reported ("1 day ago"), and Status ("Unacknowledged"). The management interface 100 is thus configured to offer a simple yet comprehensive overview of each upgrade event and/or updates cycle, empowering administrators to readily identify and locate issues, recurring problems, patterns, and facilitate troubleshooting and device compliance awareness.

Figure 2:
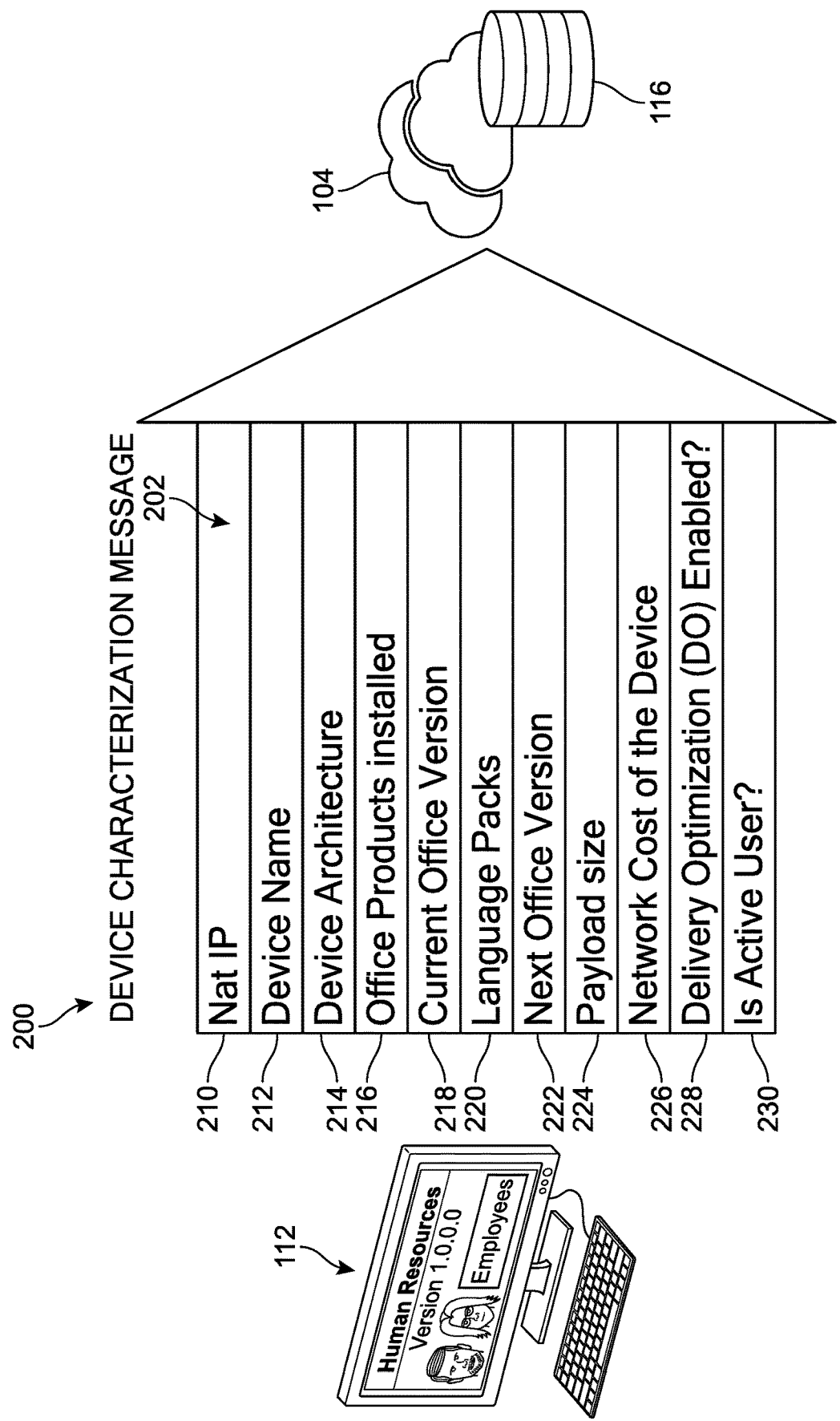
FIG. 2 is a schematic illustration of an implementation of a message conveying telemetry for a computing device to the update management service.

In order to provide further context for the uses and applications of the systems described herein, FIG. 2 presents a non-limiting example of characteristics or facets of a device characterization message ("message") 200 that may transmitted to management service 116. In different implementations, one or more of these or other characteristics, attributes, or parameters can be used by the system to determine a rollout strategy for an upcoming, pending, or in-progress series of updates. While numerous characteristics are identified below, it should be understood that in different implementations, a message can include only one, some, or none of the following information. In the example of FIG. 2, the message 200 carries a plurality of signals 202 that can provide an indication of a device's operating conditions.

Thus, in different implementations, the systems described herein can be configured to receive one or more telemetry signals (messages) from each of the client devices. This information can be used by the system to provide information to IT administrators and to allow the system(s) to develop strategies or generate deployment schedules. In FIG. 2, one example of some possible attributes or properties that may be conveyed to the management service 116 is illustrated. In this example, as message 200 from the first device 112 is sent to the management service 116 via network 104, the plurality of signals 202 can be conveyed to and received by the management service 116. In this case, these signals include a first input signal 210, a second input signal 212, a third input signal 214, a fourth input signal 216, a fifth input signal 218, a sixth input signal 220, a seventh input signal 222, an eighth input signal 224, a ninth input signal 226, a tenth input signal 228, and an eleventh input signal 230.

As represented in FIG. 2, the first input signal 210 is configured to provide the first device's Nat IP address, the second input signal 212 is configured to provide the device name or identifier, and the third input signal 214 is configured to provide the device software architecture. In addition, the fourth input signal 216 is configured to provide a list or other identification of the Office® products (or other software) that are installed on the first device 112, the fifth input signal 218 is configured to identify the version of Office® (or other software) currently running on the first device 112, the sixth input signal 220 is configured to identify the language packs being utilized by the first device 112, and the seventh input signal 222 identifies the next version of Office® (or other software) that should be installed on the first device 112. Furthermore, the eighth input signal 224 is configured to provide an estimate of the payload size of the upcoming updates that will be required by the first device 112, the ninth input signal 226 is configured to provide an estimate of the cost to the network for delivering the necessary updates to the first device 112 (e.g., the type of internet connection and/or the associated cost to the enterprise when using this connection), the tenth input signal 228 is configured to verify whether the first device 112 is enabled for delivery optimization (DO), and the eleventh input signal 230 is configured to verify whether this device is used by a user (or multiple users) and what times the user is active on the device. These signals will be received by the system for making determinations regarding deployment and distribution of updates, as will be described with respect to FIGS. 3A-3C. In some implementations, the system can include provisions for maintaining or updating the information being provided to the management service. For example, in order for the information carried by the message 200 to continue to be updated, a first message can be followed by a plurality of additional or subsequent messages carrying updated information that can be transmitted at regular or, in some cases, irregular intervals.

In other implementations, the message can include other, supplemental, or additional signals not shown in FIG. 2. For example, the message can carry signals that are configured to identify whether a computing device (a) has a logged in user (and/or multiple logged in users) and/or the user IDs of said users; (b) whether any add-ins have been installed; (c) whether any add-ins have been used on this device in the last X number of days or other period of time (e.g., 24 hours, 7 days, 14, days, 28 days, etc.); (d) whether any macro-enabled files have been accessed on this device in the last X number of days or other period of time (e.g., 24 hours, 7 days, 14, days, 28 days, etc.); (e) the availability and/or amount of free disk space; (f) Office® or other software system architecture; (g) download source type (e.g., CDN, UNC, etc.); (h) the region and/or country where the device is located (geography); (i) an estimated risk level (e.g., low, medium, high, not assessed; this can be adjusted by the administrator); (j) device make, model, and/or model family; (k) operating system version; (l) operating system architecture; (m) current servicing (update deployment) frequency or channel; and/or (n) download source identifying where the updates are being delivered from.

In different implementations, the management service can include provisions for determining whether a client computing device of the enterprise architecture is 'low risk' or 'easy-to-manage'. Classifying a device as low risk can correspond to a determination that said device is a "candidate device" for which updates can be readily administered or otherwise managed by the management service. As an example, a device that might be classified as a low risk device within an enterprise can include a device with one or more of the following device characteristics: (a) no add-ins are installed; (b) no add-ins are being used; (c) no macro enabled files are being accessed; (d) there is sufficient disk space to initiate a rollback in case of issues detected with recent update; (e) is configured to communicate with a content delivery network (CDN) to fetch updates; (f) is associated with a low network cost when communicating with the CDN; and/or (g) has 1:1 mapping for user to device. in some implementations, the management service can determine that only devices that match some or all of the above criteria be managed by the system, while in other implementations, the administrator can customize the parameters that may be applied in order for a device to be marked as a low risk device. Additional information regarding the monitoring and management of such low risk classified devices will be provided with respect to FIGS. 4-16 below.

Referring now to FIGS. 3A-3C, an implementation of a system 300 is shown for managing deployment of updates across a plurality of enterprise computing devices 302 at multiple locations 303. In FIG. 3A, the plurality of enterprise computing devices 302 is depicted, including a first plurality of enterprise computing devices 302a at a first location 303a, and a second plurality of enterprise computing devices 302b at a second location 303b. In some examples, the plurality of locations 303 may include more than two locations, each with respective enterprise computing devices 302, and/or may be at different geographic locations. At the first location 303a, the first plurality of enterprise computing devices 302a communicate with each other via a first network 305a, and may communicate with an outside network 307 via a first router or network address translation device (NAT) 306a. Similarly, at the second location 303b, the second plurality of enterprise computing devices 302b communicate with each other via a second network 305b, and may communicate with the outside network 307 via a second router or network address translation device (NAT) 306b.

Each of the plurality of enterprise computing devices 302 is configured to transmit telemetry messages 308 to a telemetry service 309 via the outside network 307. In some implementations, as part of deploying updates during a rollout, the plurality of enterprise computing devices 302 are configured to transmit device update reports 310 to an update tracking service 311 via the outside network 307. For example, a device update report 310 may indicate that an update has been successfully deployed to an enterprise computing device 302 or a device update report 310 may indicate that an error occurred in attempting to deploy the update to a given enterprise computing device 302. The system 300 includes a device information database 315 configured to maintain and make available information about the enterprise computing devices 302. The system 300 is configured to, based on newly received telemetry messages 308, update corresponding portions of the device information database 315. Such updates may be initiated by the telemetry service 309 or the device information database 315. For example, in response to receiving a telemetry message 308 identifying a version of a software product installed on an enterprise computing device 302, the system 300 would update a corresponding entry in the device information database 315 for the same enterprise computing device 302. The system 300 may be configured to, based on newly received device update reports 310, update corresponding portions of the device information database 315. Such updates may be initiated by the update tracking service 311 or the device information database 315. For example, in response to receiving a device update report 310 indicating an error occurred in deploying an update to an enterprise computing device 302, the system 300 would indicate in association with the same enterprise computing device 302 that the deployment error occurred. In some implementations, a device update report 310 may be included in a telemetry message 308. In some examples, an enterprise computing device 302 may be configured to report a successful deployment of an update by reporting a software version identifier corresponding to the update via a telemetry message 308, and the system 300 may be configured to determine that the update was successfully deployed to the enterprise computing device 302 based on the software version indicator recorded in the device information database 315.

The system 300 includes an administrator interface generator 320 which is configured to provide, via a network 321, one or more administrative user interfaces (see FIGS. 4-16) for use by an administrative user 322 for the enterprise computing device 302 via an end-user system 323. The administrator interface generator 320 is configured to display and/or set various deployment settings 325 used to determine the parameters of a rollout to the enterprise computing devices 302. In some implementations, the administrator interface generator 320 is configured to display and/or set information stored in the device information database 315. For example, the administrative user 322 might override certain values reported via the telemetry messages 308 in order to suitably control details of a rollout.

FIG. 3A additionally illustrates an update repository 330, which may be included in the system 300 or be provided as part of a separate service, such as a content delivery network (CDN). The update repository 330 is configured to store and make available software updates 334 received from an update provider 333, such as a third-party software provider. The update repository 330 may be configured to make available update metadata 331 regarding the software updates 334. For example, the update metadata 331 may include a software version identifier for a software update, one or more software product identifiers, and/or associated language packs. The update repository 330 is configured to make selected portions of the software updates 334 available in the form of update data 332. In some implementations, the system 300 is configured to obtain (which, in some examples, may include generating) update packages for various configurations of the enterprise computing device 302. As an example, a software update 334 may include first software update data for updating from a version A to a version X, a second software update data for updating from a version B to the same version X, a first language pack update data for the English language, and a second language pack update data for the Urdu language. For a first enterprise computing device 302 on which version B is installed using the English language, the system 300 would obtain a first update package including the second software update data and the first language pack update data. In contrast, for another, second enterprise computing device 302, having version A of the software installed using both the English and Urdu languages, a different, second update package would be obtained that includes the first software update data and both the first and second language pack update data. Thus, the enterprise computing devices 302 are able to, as part of deploying an update, receive update packages tailored to their particular configurations.

Continuing the implementation of FIG. 3A, FIG. 3B illustrates additional features of the system 300 which are configured to select and/or prioritize the enterprise computing devices 302 for update rollouts. In some implementations, the system 300 includes a candidate device selector 335 (which may be referred to as a low-risk device selector) configured to select candidate devices 337 from the plurality of enterprise computing devices 302 suitable for participating in an automated rollout performed by the system 300. The candidate device selector 335 includes a device condition assessor 336 which is configured to obtain and process information about the enterprise computing devices 302 maintained by the device information database 315.

The system 300 includes a device partitioner 340 configured to assign each of the enterprise computing devices 302 (or the candidate devices 337) to one of a plurality of device partitions 345. It is noted that although the device partitions 345 are illustrated separately in FIG. 3B it is simply shown to illustrate the assignment of enterprise computing devices 302 to the various device partitions 345, which in some examples might simply be recorded as a field in device records maintained by the device information database 315. In some implementations, the device partitioner 340 includes a network address-based partitioner 341 which is configured to assign devices to device partitions 345 based on associated network addresses. In some examples, one or more of the device partitions 345 may be associated with a single NAT, such as the first NAT 306a for the first location 303a, which may be performed based on a network address assigned to the first Nat 306a and/or NAT network addresses of the first plurality of enterprise computing devices 302a, each being within a range, matching a network address mask, or meeting some other network address based condition. By way of example, all of the first plurality of enterprise computing devices 302a might be assigned to a first device partition 345a while each of the second plurality of enterprise computing device 302b are assigned to either a second device partition 345b or a third partition 345c.

In some implementations, the device partitioner 340 includes a package-based partitioner 342 configured to assign enterprise computing devices 302 to device partitions 345 based on which one of a plurality of update packages is to be deployed to an enterprise computing device 302 as part of a current rollout. Each of the device partitions 345 corresponds to one or more of the plurality of update packages 343. By way of example, there may be three different update packages 343 with enterprise computing devices 302 associated with a first update package 343 being assigned to the first device partition 345a, enterprise computing devices 302 associated with a second update package 343 being assigned to the second device partition 345b, and enterprise computing devices 302 associated with a third update package 343 being assigned to the third device partition 345c.

In some implementations, the device partitioner 340 is configured to perform both package-based and network address-based partitioning of enterprise computing devices 302 for a rollout. For example, each unique combination of network address-based partitioning and package-based partitioning may correspond to a separate one of the device partitions 345. By way of example, assuming two different update packages 343, both being installed at the first location 303a and the second location 303b, this would result in four device partitions: a first device partition for the first plurality of enterprise computing devices 302a receiving a first update package 343, a second device partition for the first plurality of enterprise computing devices 302a receiving a second update package 343, a third device partition for the second plurality of enterprise computing devices 302b receiving the first update package 343, and a fourth device partition for the second plurality of enterprise computing devices 302b receiving the second update package 343.

The system 300 also includes a device ranker 346 configured to assign, based on the information maintained by the device information database 315, priority levels to the enterprise computing devices 302 assigned to each of the device partitions 345, resulting in prioritized device partitions 348. As will be discussed in FIG. 3C, these priority levels will be used to schedule deployment of updates for a rollout. In some implementations, enterprise computing devices 302 that are configured with delivery optimization are assigned higher priority level(s) than devices without delivery optimization, allowing them to be among the first devices deployed and then used to perform peer to peer-based delivery of update packages within a local network. In some examples, among delivery optimized devices, priority levels are assigned according to a network cost determined for each of the devices. For example, devices with delivery optimization having the lowest available network cost would be given the highest priority level to ensure they receive update packages as part of an initial phase of the rollout. In some implementations, a priority level is assigned according to an amount of user activity reported by the telemetry messages 308 and recorded in the device information database 315. For example, devices with lower user activity may be assigned higher priority level(s). This allows a deployment to begin with devices less likely to be impacted by an update that negatively impacts users, for example leading to system instability, thereby ensuring a prompt deployment across the plurality of enterprise computing devices 302, and managing risks associated with that deployment. Furthermore, in some implementations, priority levels are assigned according to update package sizes with larger update packages being given higher priority levels.

Continuing the implementation of FIGS. 3A and 3B, FIG. 3C illustrates additional features of the system 300 which are configured to schedule deployments for a rollout according to the deployment settings 325 and the prioritized device partitions 348. The system 300 includes an update scheduler 350 configured to generate an update deployment schedule 355 for the rollout. In the example shown in FIG. 3C, the update deployment schedule 355 is a "phased" update deployment schedule in which the deployment to enterprise computing devices 302 is performed in a series of phases or rings (see FIGS. 13-16 below). For example, FIG. 3C shows first phase devices 356a that are currently scheduled for update deployment during a first phase, and second phase devices 356b that are currently scheduled for update deployment during a second, subsequent phase, with further subsequent phases not shown in FIG. 3C.

There are various approaches that the update scheduler 350 can use to determine a number of phases, a timing of the phases, and devices assigned to each of the phases. In some examples, the deployment settings 325 may include a deferral period 326 for deferring update deployments which may be used by the update scheduler 350 to identify a start time for a first phase based on a release time 329 indicated by the update metadata 331 for the current rollout. For example, with a deferral period 326 of five days and a release time 329 of April $1^{st}$, the start time for the first phase would be April $6^{th}$. The deferral period 326 allows the administrative user 322 to specify a period of time sufficient to evaluate the suitability of an update for broad deployment to the plurality of enterprise computing devices 302. In some examples, the deployment settings 325 include a deadline 327 for completion of the rollout and the update scheduler 350 is configured to determine a number of phases for the update deployment schedule 355 targeted towards completing the rollout by the deadline 327. The deadline 327 may be an amount of time relative to the beginning of the first phase, or may be an absolute time such as a specified date and/or time for completion of the rollout. Using a timing determined between deployment phases which in some cases may simply be a fixed period of time such as once day, or every other day (although more complex arrangements that include and/or exclude particular days and/or times such as weekends, evenings, and/or holidays) the number of phases and their respective times are calculated. For example, if the deadline 327 indicates a total period of 12 days for the rollout and each deployment phase is 2 days apart, there would be six deployment phases. Then, the update scheduler 350 obtains a total network data transfer size for the deployment to the enterprise computing devices 302 and determines a per-phase network data transfer limit. In some implementations, the total network data transfer size corresponds to transfers of update package data via the outside network 307 to the locations 303, as that generally corresponds to network links for which the administrative user 322 wishes to manage bandwidth consumption to avoid interfering with other uses of those network links. By way of example, for a total network data transfer size of 30 GB and six deployment phases, a per-phase transfer size may be obtained. In some examples, the update scheduler 350 is configured to increase per-phase transfer sizes, for at least some phases, to provide additional margin to accommodate environmental failures.

In some examples, the deployment settings 325 include a network data transfer limit 328 for a period of time. For example, the period of time may be a day (thereby indicating a daily network data transfer limit), or the period of time may be a deployment phase. Then, the update scheduler 350 obtains a total network data transfer size for the deployment to the enterprise computing devices 302. In some implementations, the number of deployment phases is then calculated based on dividing the total network data transfer size by the network data transfer limit 328. For example, given a total network data transfer size of 50 GB and a network data transfer limit 328 of 5 GB, that would result in 10 deployment phases. In some implementations, an additional number of phases may be added to this in order to provide a buffer to accommodate environmental failures, such as network link failures and/or device or system failures. For example, the calculated 10 phases might be increased by an additional two phases to 12 phases thereby, assuming no environmental failures, having a per-phase transfer size of approximately 4.25 GB, giving an additional margin of 0.75 GB for each deployment phase. In some implementations, the per-phase transfer size is not reduced for the first phase, as there will be no failures from previous phases to provide margin for.

Using the per-phase transfer sizes, the update scheduler 350 assigns devices to deployment phases. In some implementations, the update scheduler 350 processes the prioritized device partitions 348 in order of non-increasing priority levels; for example, beginning with devices assigned to the highest priority level being assigned to the first deployment phase. Proceeding through the prioritized device partitions 348 in this way, the update scheduler schedules devices for the earliest available deployment phase. For example, if a current device has an update package too large to fit in the per-phase transfer size for the first phase with already assigned devices, it is assigned to the next phase with enough remaining per-phase transfer size, while a later device with a smaller update package may still be assigned to the first phase since it fits within the remaining per-phase transfer size. In such a manner, each of the candidate devices 337 may be assigned to one of the deployment phases. In some implementations, as illustrated by later figures, the administrative interface generator 320 is configured to display details of the update deployment schedule 355 to the administrative user 322, receive and apply changes to the deployment settings 325 input by the administrative user 322 to adjust the update deployment schedule 355, and cause a new update deployment schedule 355 to be generated accordingly (which in some instances, may involve regenerating the prioritized device partitions 348).

The system 300 includes an update commander 360 configured to identify the devices assigned to a current deployment phase (shown as current phase devices 357) and issue one or more update commands 362 to cause the current update, via network transfers of appropriate update packages 343, to attempt deployment of the current update to the current phase devices 357. A method of delivery and/or an effect of an update commands 362 may be determined based on whether a pull-based or push-based transfer of update packages 343 and/or indications of the availability of update packages 343 is performed. However, it is understood that, due to various circumstances, the update may not be successfully deployed to all of the current phase devices 357 during the current phase; for example, one or more of the current phase devices 357 may not be powered on, not connected to an appropriate network, failure to successfully install a received update package, and/or encounter an environmental failure. Much as noted in FIG. 3A, the current phase devices 357 by provide device update reports 310 to the system 300, allowing it the system 300 to identify current phase devices 357 remaining for deployment. In some implementations, if the current phase devices 357 include un-deployed devices, the update deployment schedule 355 is regenerated prior to initiating a subsequent deployment phase to better ensure deployment to those devices.

As noted earlier, the management of recurring or periodic updates across a large number of computing devices can sometimes be perceived by many IT administrators as an onerous and/or tedious process. There can also be concern that such updates potentially impact their (enterprise's) overall network capacity. As shown in FIGS. 3A-3C above, in order to assist administrators, a management service can receive telemetry signals from each of the enterprise client devices and analyze the collective data to provide smarter and more effective roll-out strategies that may be used to guide the admins to a more user-friendly and comprehensive means by which they can manage delivery of updates to their end users and meet their organizational requirements. Referring now to FIGS. 4-12, some examples of user interfaces of an update management service client application through which such management and tools may be enabled are illustrated.

Figure 4:
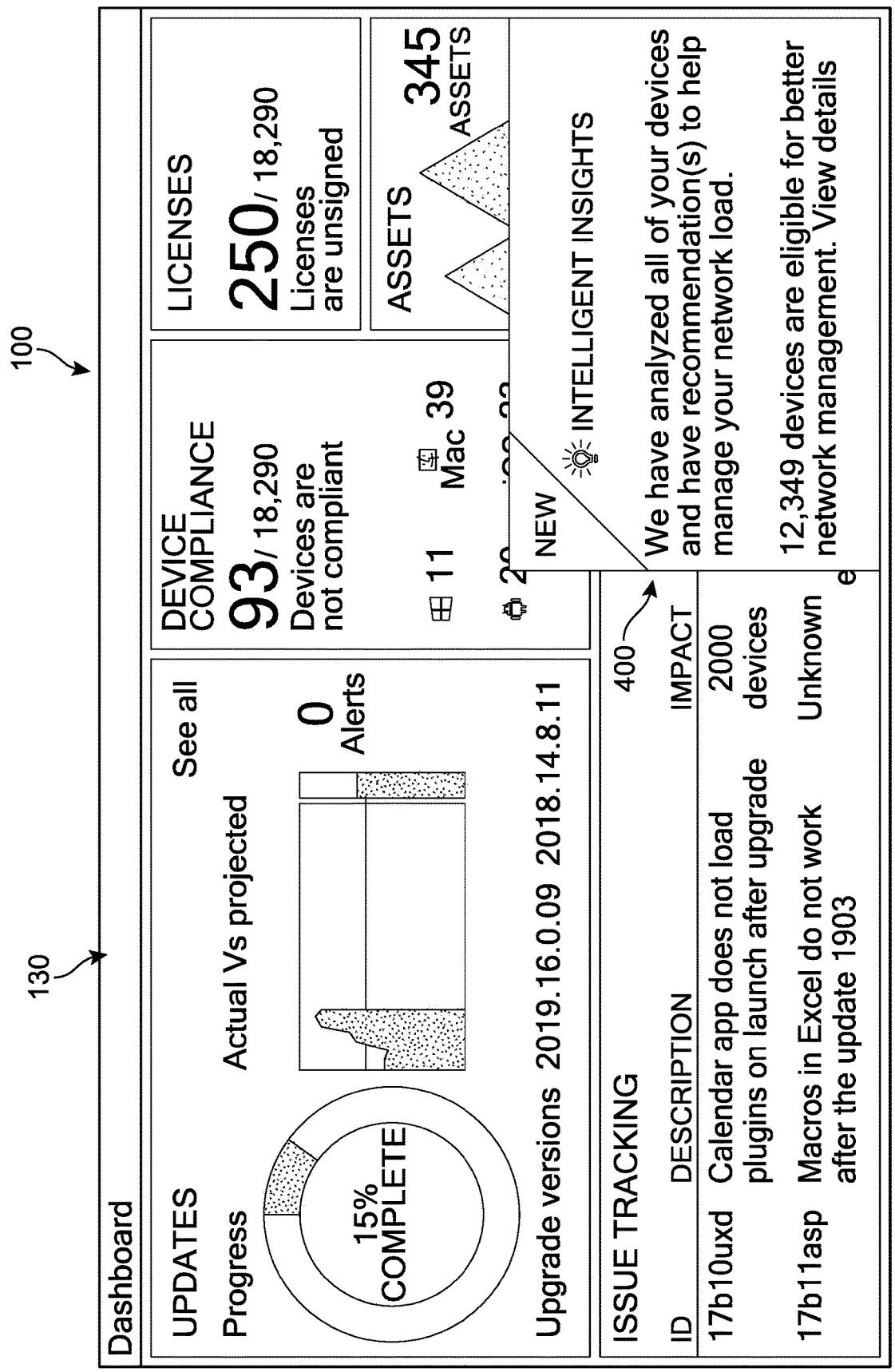
FIG. 4 is a representation of a device display with an implementation of an overview interface for an update management service client application.

In FIG. 4, the dashboard interface 100 introduced in FIG. 1B is again shown. It can be appreciated that the various notification panels 130 presented include information that was generated following analysis of the telemetry signals (messages) received from the devices of the enterprise architecture. As a general matter, the dashboard interface 100 provides data based on the resulting large-scale metrics for the enterprise devices as a whole (e.g., the 'big picture'). In different implementations, the system can include provisions for determining the expected network load and strategies for improving management of the load. As an example, in FIG. 4, the system generates an optional suggestion message ("message") 400 ("Intelligent Insights: We have analyzed all of your devices and have recommendation(s) to help manage your network load. 12,349 devices are eligible for better network management. View details.") is shown as a pop-up window. In other implementations, the message may be shown as a floating dialog window or any other type of notification UI such as a floating menu, a dialog box or callout, a window or drop-down extending from a desktop or application menu, an email, or via any other application communication or presentation means. The message 400 can serve to notify the administrator that additional mechanisms and options are available for the updates being applied to the enterprise devices. In some implementations, the message 400 can include or itself comprise an actuatable option that can be actuated by a user to trigger a response or presentation of other information, such as a data overview panel 500 shown in FIG. 5.

Figure 5:
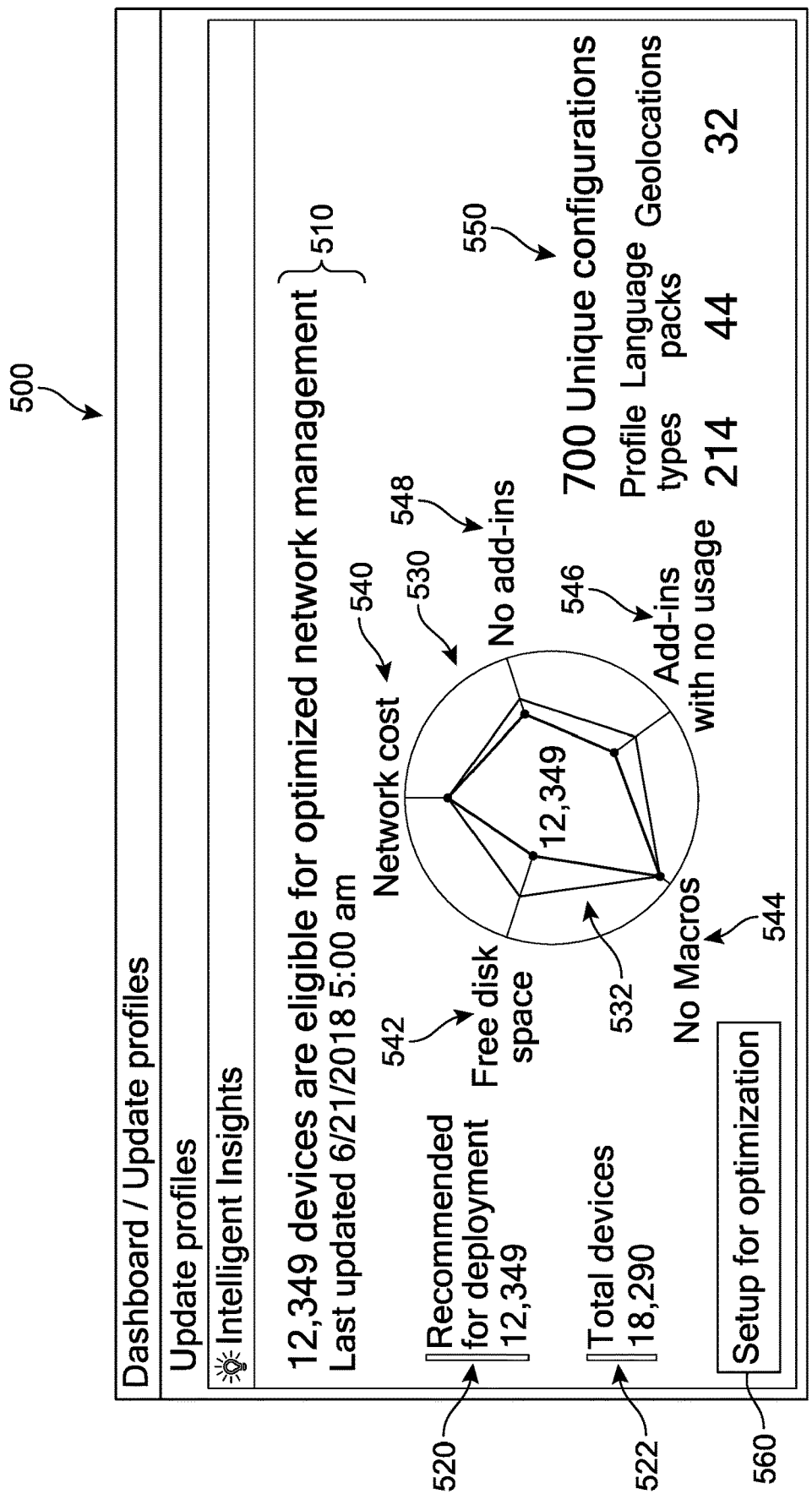
FIG. 5 is a representation of a device display with an implementation of an optimization guide interface for the update management service client application.

In FIG. 5, the data overview panel 500 offers a synopsis 510 of the data ("12,349 devices are eligible for optimized network management. Last updated Jun. 21, 2018 5:00 am") that informs the reader that there are a number of devices (here, 12,349 of the 18,290 total devices) that have been recognized as having met specific criteria (see FIG. 2 above) for low-risk devices and can be served by a more efficient management approach. The data overview panel 500 further includes a graphic 530 that succinctly conveys to the administrator the criteria that were applied and the proportion of devices that matched said criteria. In this case, the graphic 530 is a radar chart that is configured to display multivariate data. Thus, the graphic 530 depicts quantitative variables corresponding to a first criteria 540 (network cost), a second criteria 542 (free disk space), a third criteria 544 (no macros), a fourth criteria 546 (add-ins with no usage), and a fifth criteria 548 (no add-ins). As noted earlier, in other implementations, the criteria may differ, and so it should be understood that the data shown in FIG. 5 is shown for purposes of example only. Furthermore, additional or other data representations may be used beyond that of radar charts, or no graphic may be provided. In some implementations, the administrator can input a preference for the manner in which data is displayed which the system can be configured to implement. It can be appreciated that this type of overview and/or message 400 (see FIG. 4) can be shown to the end-user at the time of first access or first use of the management service, and can in some cases be repeatedly presented until an update profile is created.

The data overview panel 500 also includes a first information notice 520 ("Recommended for deployment 12,349"), a second information notice 522 ("Total devices 18,290"), a third information notice 550 ("700 unique configurations/Profile types: 214/Language packs: 44/Geolocations: 32") that can each add to the administrator's understanding of the context of the proposed deployment procedure and affected devices. Thus, as shown in FIG. 5, various analytics for the network load can be performed against a set of data characteristics associated with the enterprise devices such as, but not limited to: (a) a total number of devices; (b) a total number of recommended devices; (c) the number of distinct configurations; (d) the number of distinct geolocations; (e) the network cost across the devices; (f) the available disk space for the devices; (g) macro usage; (h) add-in usage; (i) whether this is a recurring update profile; (j) whether these devices would be configured for a particular release servicing option (e.g., Microsoft® Semi-Annual Channel (SAC) that delivers a feature update twice a year); (k) a comprehensive list of the devices; and/or (l) a release cadence for the updates (e.g., the SAC and/or other recurring or repeated update schedules).

Figure 6:
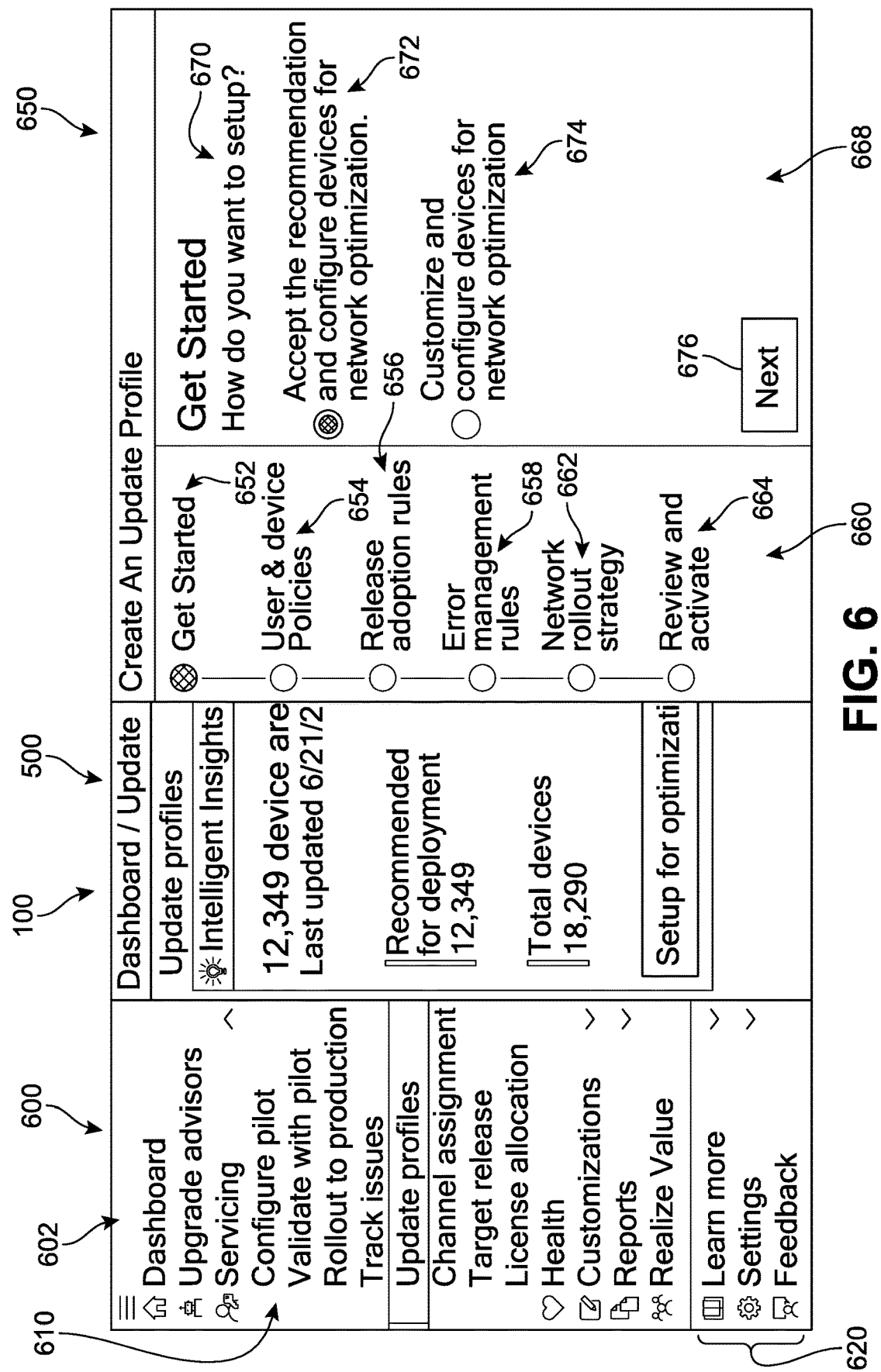
FIG. 6 is a representation of a device display with an implementation of an update profile creation interface for the update management service client application.

If the administrator wishes to proceed with a creation of an update profile, an actuatable option 560 ("Setup for optimization") is offered. FIG. 6 depicts an example of a set-up interface 650 being presented in response to actuation of actuatable option 560. The set-up interface 650 is shown overlaid on management service's main interface 600. The specific location of the set-up interface 650 represented in FIG. 6 is intended to underscore the relationship of the message of the set-up interface 650 with the management service application. However, it should be understood that in other implementations, the set-up interface 650 may be displayed or generated anywhere else on the screen(s) associated with the server or admin system, including spaced apart from, adjacent to, or around other management service interfaces.

The set-up interface 650 includes an update profile sequence 660 as well as a primary interface 668 for moving through the update profile sequence 660. In some implementations, the update profile sequence 660 identifies a plurality of workflow stages. For example, in FIG. 6, the workflow stages include a first stage 652, a second stage 654, a third stage 656, a fourth stage 658, a fifth stage 662, and a sixth stage 664. In other implementations, fewer or additional stages may be presented, or a sequence may not be depicted. In this case, the details of first stage 652 ("Get Started") are provided in a primary interface 668 that includes a title portion ("Get Started/How do you want to setup?") to notify the user that the first stage 652 is configured to permit a choice between a recommended update profile approach and a customizable update profile approach. Thus, two options including a first option 672 ("Accept the recommendation and configure devices for network optimization") and a second option 674 ("Customize and configure devices for network optimization"). Upon selection of the first option 672, the user can be automatically navigated to the sixth stage 664, as will be discussed with reference to FIG. 7. Alternatively, in response to a selection of the second option 674, the system can be configured to guide the user through a series of steps (workflow stages) for collecting the user's preferred settings and criteria (see FIGS. 8-12). It should be understood that the interfaces and options shown in the drawings represent only an example of a possible interface, and the information displayed and options provided can differ based on the administrator privileges granted to the end-user. Thus, a more senior or supervisory administrator might see information for devices across the entire enterprise (i.e., a more holistic view), while a lower level administrator may only be shown devices corresponding to his or her own purview.

In different implementations, the main interface 600 can include options for further navigation of the application and service. For example, in FIG. 6, a menu 602 includes a plurality of options 610 for accessing various features of the service. In this example, a section labeled Servicing includes a set of options such as (a) configure pilot for initial testing of the management service; (b) validate with pilot for establishing a strategy based on the pilot testing; (c) rollout to production for initiating an update procedure across the enterprise; (d) track issues to review and address issues that have been detected during the update process; and (e) update profiles for managing the update rollout (as will be discussed in greater detail herein), as well as other options for fine-tuning the performance of the service and/or reviewing the effect of the updates on the computing devices.

When a user selects one of the options 610, hovers over an option, clicks on the option, or otherwise indicates a desire to view tools and tasks associated with the option, the system may interpret the action as a triggering event. In this case, in response to the triggering event, the application can display a native control in the form of a submenu, listing a plurality of sub-options associated with the selected option. It should be understood that in other implementations the menu 602 options may not be presented or can be hidden. Furthermore, the options shown in the figures are for illustrative purposes only, and in different implementations, the types and labels of options can vary. In other implementations, there may be fewer or greater number of options, and/or the options made available may differ from those shown here. In other implementations, any other alphanumeric text or graphics may be displayed in conjunction with the selection.

In FIG. 6, the menu 602 also includes a secondary set of options 620 for providing additional information, help, guidance, send suggestions, tutorials, settings, and feedback. For example, a Settings option can allow users to add or modify the available options or policies, add or delete workflow stages, as well as select or upload different graphical icons to represent the specific stages. The Settings option may also or alternatively offer users the opportunity to adjust the display, content, format, communication, access, and other settings associated with the management tools. It should be understood that a Settings option may be made available on all of the menus described herein, whether or not explicitly identified. Furthermore, in different implementations, any of the menus or native controls and options described herein can also include or be associated with an optional tool overview or Help tool. Such options can be configured to provide an introduction or summary of the offered feature(s) or tool(s), including but not limited to presentation of a teaching guide, FAQs, search for help topics, images, schematics, tutorial overviews, screenshots, photos, slideshow, video, audio, and other such content or guidance.

Figure 7:
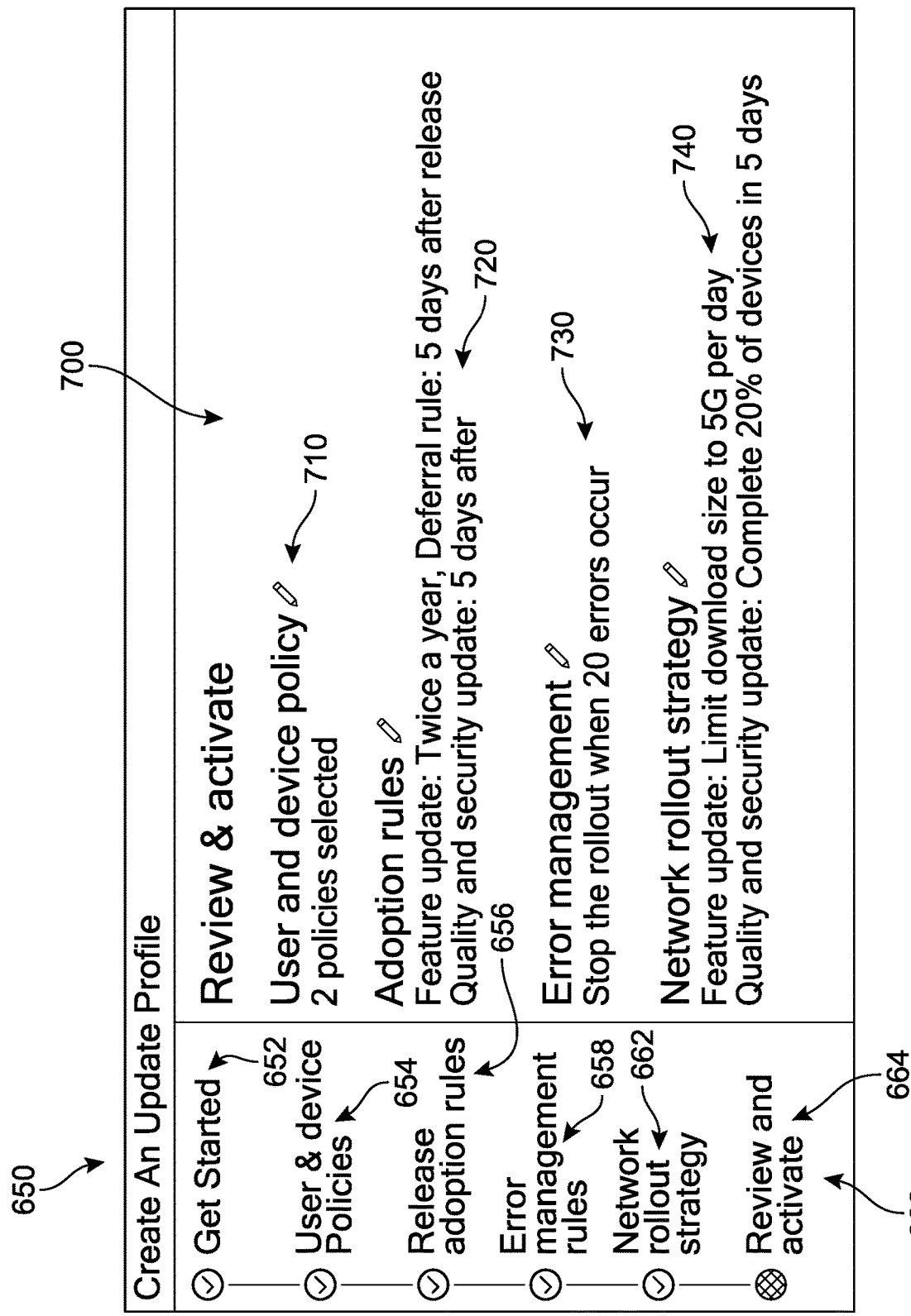
FIG. 7 is a representation of a device display with an implementation of an update profile creation interface for activating a recommended update profile.

As noted earlier, selection of the first option 672 in FIG. 6 can trigger activation of a default or pre-set process for the service. Referring to FIG. 7, in response to a selection of the recommended configuration, a summary interface panel 700 can be presented within the set-up interface 650, adjacent to the update profile sequence 660, which now depicts the 'current' stage as sixth stage 664 ("Review and activate"), after having navigated directly from the "Get Started" first stage 652. The summary interface panel 700 includes a summary of the workflow stages as they have been preconfigured by the system recommendations. In this example, the summary interface panel 700 displays a first item 710, a second item 720, a third item 730, and a fourth item 740. Each item corresponds to a workflow stage of the update profile creation sequence (described in greater details below with respect to FIGS. 8-12). In this case, the first item 710 (User and Device policy) reflects a default configuration in which two policies have been selected, the second item 720 (Adoption Rules) reflects a default configuration in which feature updates should occur twice a year with a deferral rule of 5 days after release, and where quality and security updates with a deferral rule of 5 days after release. Furthermore, the third item 730 (Error management) reflects a default configuration in which rollout should be paused when 20 errors occur, and the fourth item 740 (Network rollout strategy) reflects a default configuration in which downloads of feature updates are limited to 5 GB per day and downloads of quality and security updates should be completed for (at least) 20% of devices in 5 days. It can be seen that each item includes a 'pencil' symbol which can represent an actuatable option for that item to modify the configuration shown.

In different implementations, users can access options for further customizing the processes depicted herein. For example, referring back to FIG. 6, in response to a selection of the second option 674, a different sequence can be triggered in which the application offers a guided workflow customization process. While the customization is shown across several interface panels in FIGS. 8-12, in other implementations, the customization can occur on a single panel with a scroll-bar to view all options on the same page.

Figure 8:
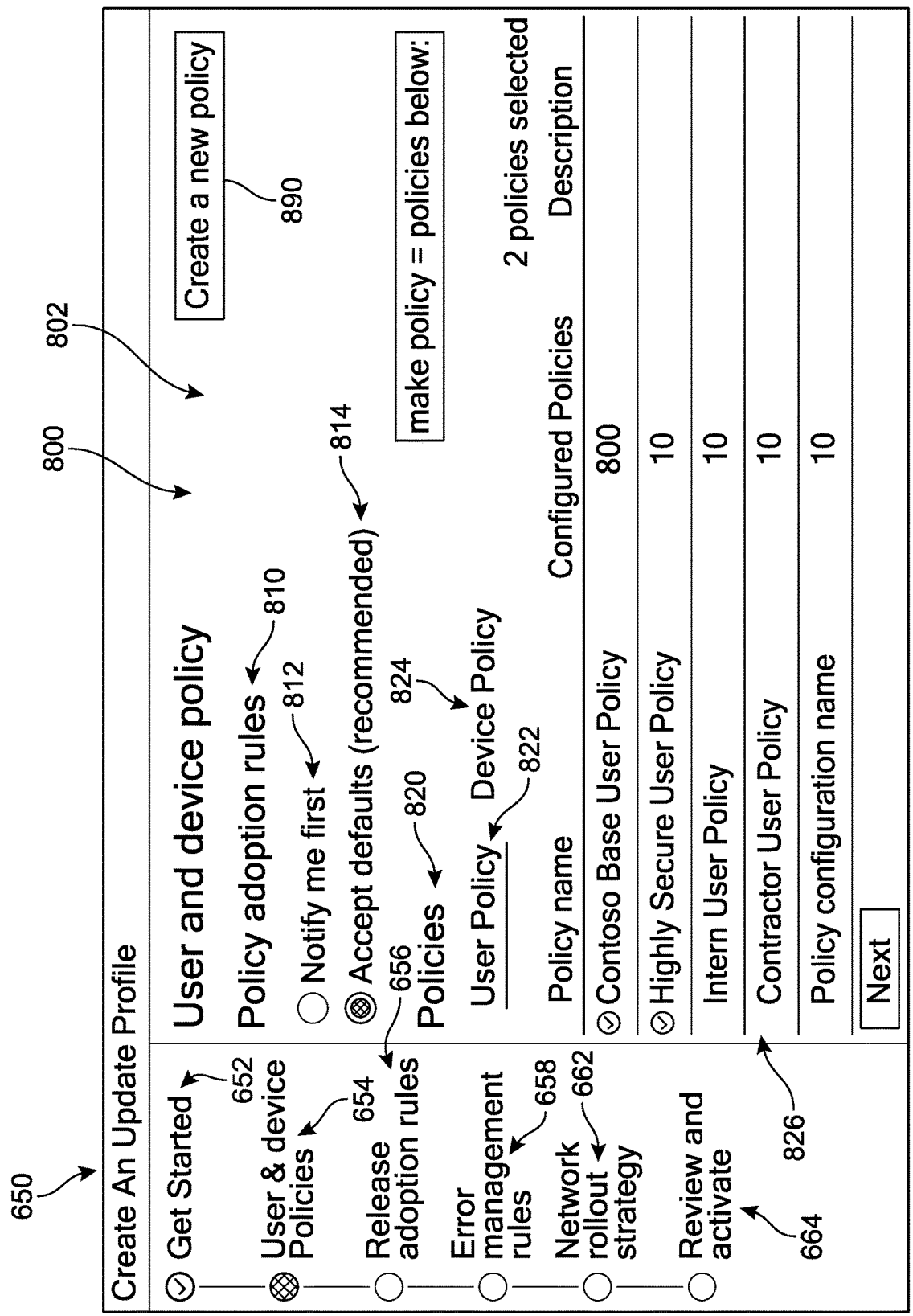
FIG. 8 is a representation of a device display with an implementation of an update profile creation interface for selection of a user and device policy.

In FIG. 8, in response to a selection of the customization configuration option, a first interface panel 800 can be presented within the set-up interface 650, adjacent to the update profile sequence 660, which now depicts the 'current' stage as second stage 654 (User and device policies). The first interface panel 800 includes a first plurality of options 802 corresponding to policy adoption rules 810 and policies 820. As a first example, the policy adoption rules 810 can be configured to either notify the administrator first when a policy is to be adopted (see a first selection 812) or accept policy rule defaults (those recommended by the system) (see a second selection 814). Policies 820 can be created for users (see "User Policy" view 822) and/or devices (see "Device Policy" view 824). In some implementations, a listing of available policies 826 may be presented which can be identified by a policy name and have corresponding information such as the number of policies that have been configured for this policy, and/or a policy description. Similar information can be provided for device policies when the Device Policy view is selected. In this case, two policies (Contoso Base User Policy, Highly Secure User Policy) have been pre-selected. The first interface panel 800 is configured to receive inputs from the administrator that can modify or delete these selections, as well as add more policies to adopt. In one implementation, users may be provided with a policy creation option 890 ("Create a new policy") to add to the listing of available policies 824.

Thus, as shown in FIG. 8, during creation of a recurring low risk devices update profile, an IT Administrator can choose different user and device policies they wish to enforce with every feature update as well as with every security and quality update. The administrator can also choose adoption rules so that the new policies are automatically applied, or alternatively, adoption rules where the administrator is notified of the new policies but these policies are not automatically applied with the updates. In order to execute these preferences, the system is configured to receive inputs corresponding to (a) the selected list of user policy profiles (see user policy 822); (b) the list of device policy profiles (see device policy 824); (c) adoption rules for this policies (e.g., notification first vs. automatic application of policies; see policy adoption rules 810); and/or (d) a link to create a new user or device policy (see policy creation option 890).

Figure 9:
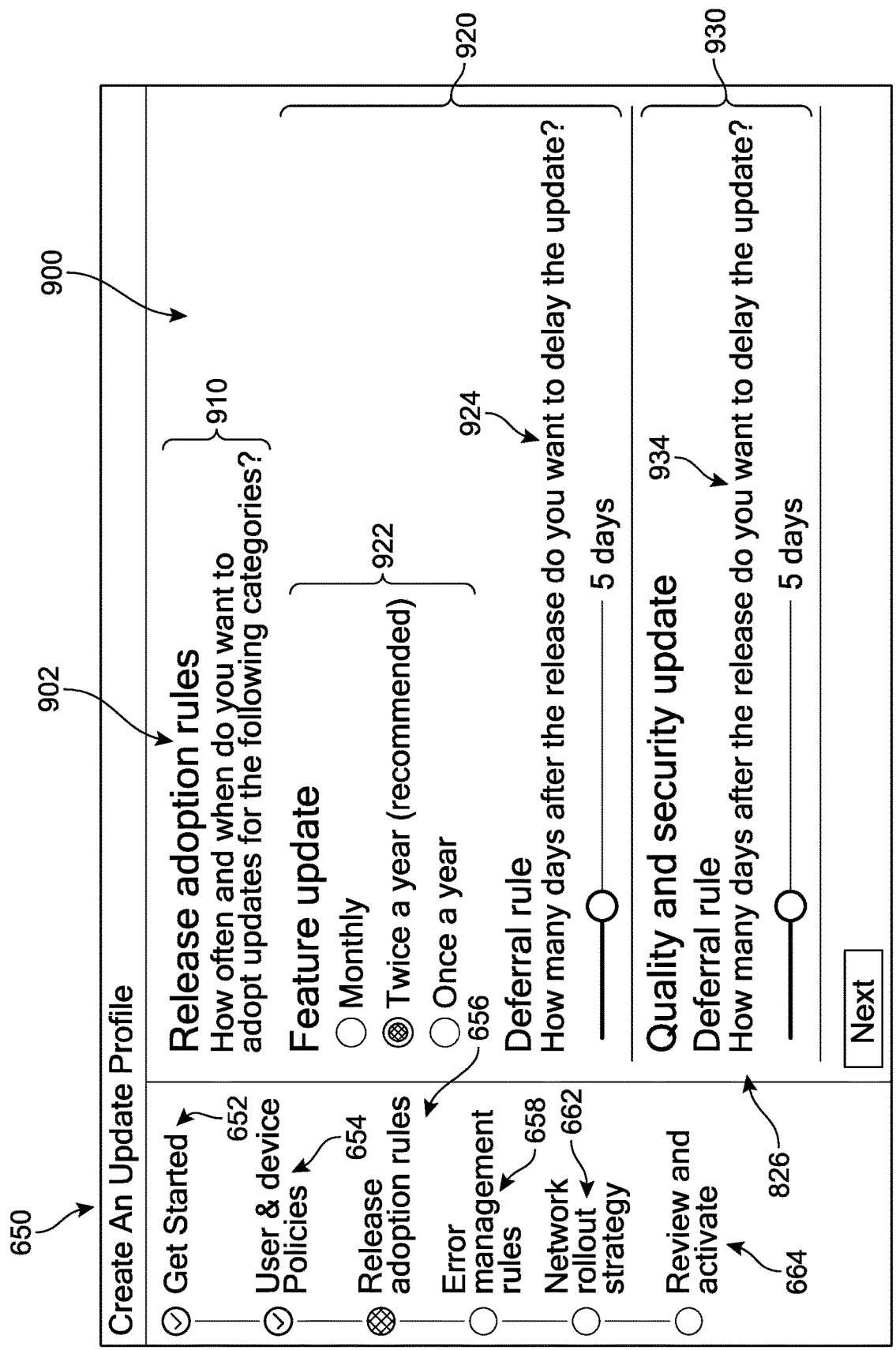
FIG. 9 is a representation of a device display with an implementation of an update profile creation interface for selection of release adoption rules.

When the end-user is satisfied with the designated policies they may move to the next workflow stage, as illustrated in FIG. 9. A second interface panel 900 is now presented within the set-up interface 650, adjacent to the update profile sequence 660, which depicts the 'current' stage as third stage 656 (Release adoption rules). The second interface panel 900 includes a second plurality of options 902 corresponding generally to release adoption rules 910 ("How often and when do you want to adopt updates for the following categories?"), and more specifically includes options related to feature updates 920 as well as quality and security updates 930. As an example, the feature updates 920 can be configured to occur at specified intervals 922, as selected by the user. In this case, feature updates may occur monthly, twice a year (as recommended by the system and shown as the default selection), or once a year. In other implementations, additional or alternate time interval or frequency options may be offered (e.g., 2 weeks, 6 months, three times a year, etc.), and/or there may be a manual input box for a user to more directly specify the desired interval. A first deferral rule 924 for the feature updates can also be adjusted by the user, by which the user can specify how many days after the release of a feature update from a software update provider the update should be deployed. In this case, the default is 5 days, and can be modified via a sliding scale interactive tool. In other implementations, users may be able to enter the waiting period duration manually, or through a presentation of other options.

In contrast, while the quality and security updates 930 can be configured to follow a second deferral rule 924 can also be adjusted by the user, by which the user can specify how many days after the release of a quality and/or security update from a software update provider the update should be deployed, in FIG. 9, the system does not provide an opportunity to adjust the frequency of the updates. In this case, the default is 5 days, and can be modified via a sliding scale interactive tool. In other implementations, users may be able to enter the waiting period duration manually, or through a presentation of other options. It can be appreciated that this is a preferred approach and is configured to better protect the enterprise computing devices. For example, security and/or quality updates, having a greater impact on the overall health and stability of the enterprise, should be deployed generally at the times that they are released, rather than per a more convenient or regular schedule or pattern. However, in some implementations, the user may access additional customization settings to impose a desired frequency on all types of updates, including both feature updates and quality and security updates.

Thus, as shown in FIG. 9, during creation of a recurring low risk devices update profile, an IT Administrator can choose different update profile release adoption rules they wish to enforce with their updates, including deferral durations for feature, security and quality updates. In some implementations, the administrator can also choose the channel or frequency at which feature updates are automatically deployed. In order to execute these preferences, the system is configured to receive inputs corresponding to (a) available channels (frequencies) for feature updates (see specified intervals 922) and/or a release cadence for the selected channel; (b) the number of deferral days for feature updates (see first deferral rule 924); (c) the number of deferral days for security and quality updates (see second deferral rule 934). In some implementations, the maximum deferral value for feature updates that may be inputted by a user can vary based on the frequency selected. For example, for updates occurring twice a year, the deferral can be up to 120 days, while updates that occur monthly can be deferred up to seven days.

Figure 10:
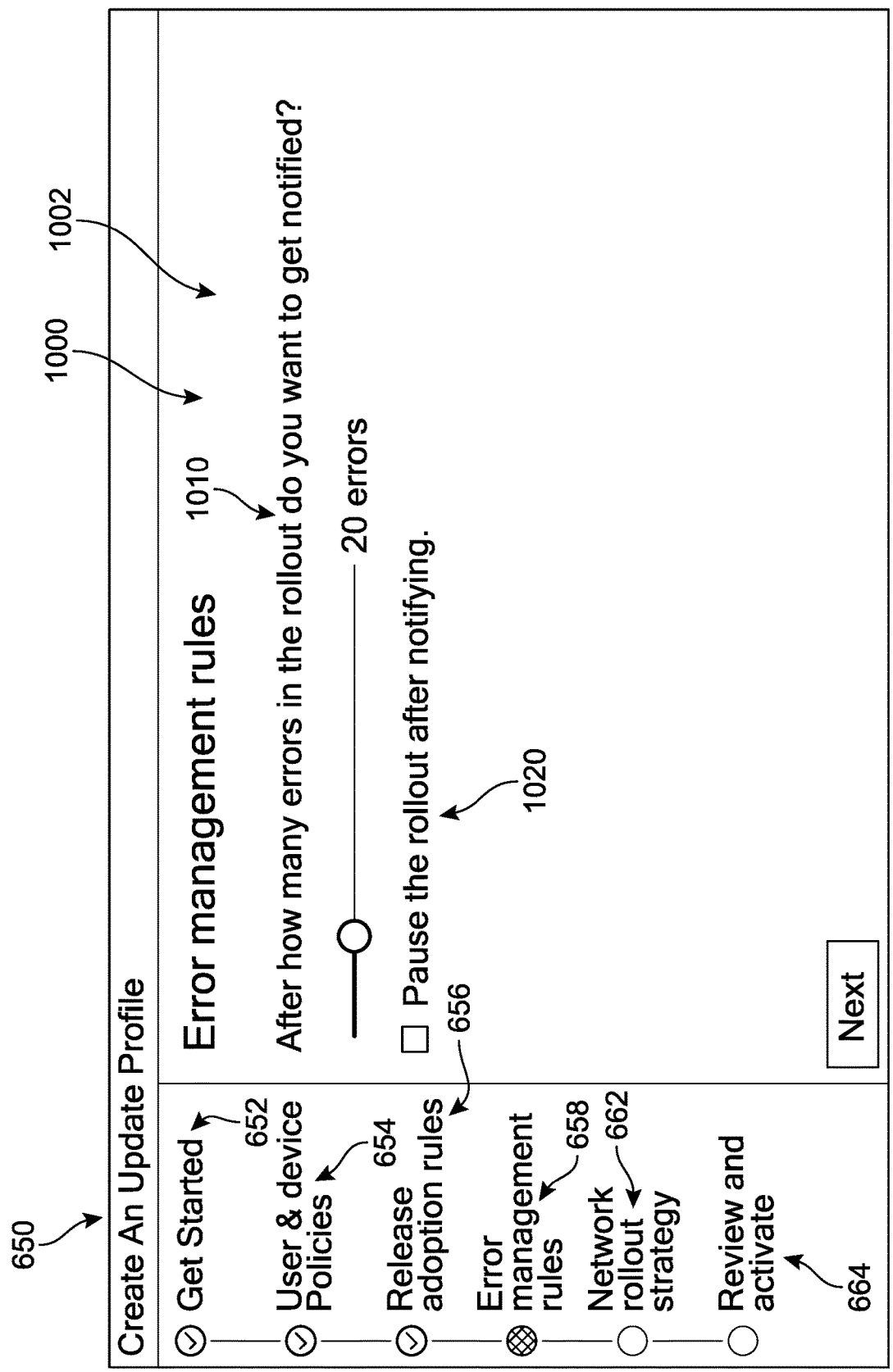
FIG. 10 is a representation of a device display with an implementation of an update profile creation interface for selection of error management rules.

When the end-user is satisfied with the designated release adoption rules, they may move to the next workflow stage, as illustrated in FIG. 10. A third interface panel 1000 is now presented within the set-up interface 650, adjacent to the update profile sequence 660, which depicts the 'current' stage as fourth stage 658 (Error management rules). The third interface panel 1000 includes a third plurality of options 1002 corresponding generally to error management rule 1010 ("After how many errors in the rollout do you want to get notified?"), and more specifically includes an option to pause the rollout after notifying the user (see a pause option 1020). The error management rule 1010 can be adjusted by the user, and allows the user to specify how many errors can occur and/or what percent of devices can be associated with errors during the rollout before they wish to be informed of the situation and/or initiate remedial actions, such as but not limited to pausing the rollout, or pausing deployment to a particular set of computing devices. In other words, an error threshold can be selected by the administrator. In this case, the default is 20 errors, and can be modified via a sliding scale interactive tool. In other implementations, users may be able to enter the number of errors manually, or through a presentation of other options. In some implementations, the types of errors (e.g., device error, update-related error, network error, connectivity error, etc.) can also be listed for the user to more particularly identify which types of errors (and their respective number of errors) should elicit a notification and/or a pause in the rollout.

Thus, as shown in FIG. 10, during creation of a recurring low risk devices update profile, an IT Administrator can choose different update profile thresholds for errors that should be met before initiating a mitigation action and/or pausing the rollout. The error threshold can be understood as being based on deployment failures across a percentage of devices that were designated for the update attempts and the percentage of those devices which encountered an error. In addition, in some implementations, the system can include provisions for permitting administrators to define threshold for degraded productivity blockers with respect to a percentage of devices impacted with a certain class of issues. In order to execute these preferences, the system is configured to receive inputs corresponding to (a) a deployment failure threshold percentage; (b) a productivity impact threshold percentage; (c) whether the administrator should be notified about a threshold being reached; (d) the administrator's selected remediation actions in response to a threshold being reached (e.g., auto-recover (roll back to LKG) and/or pausing the rollout); (f) a previous deployment success rate or percentage for these devices; and/or (g) a previous health of Office® or other software applications for these devices.

Figure 11:
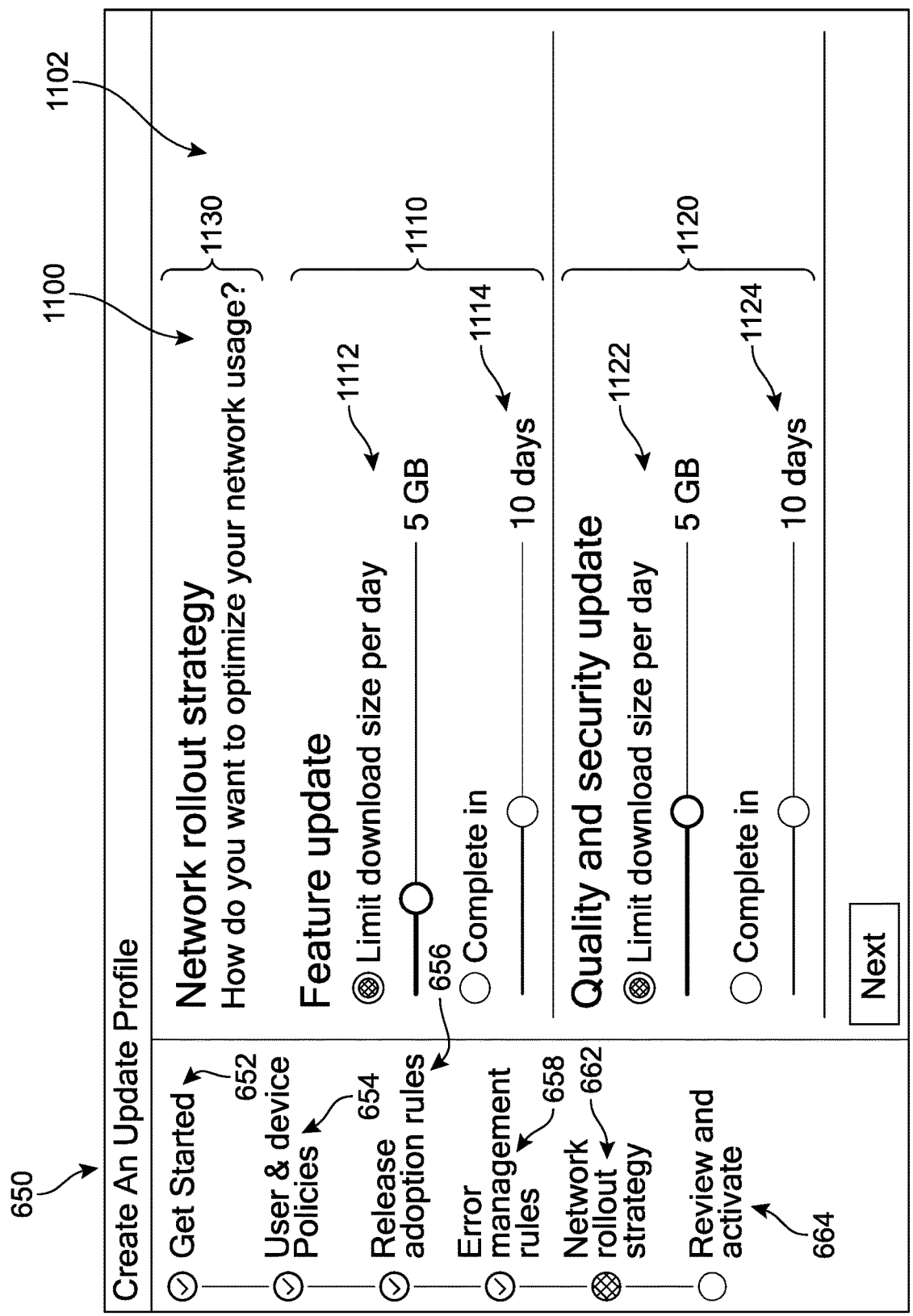
FIG. 11 is a representation of a device display with an implementation of an update profile creation interface for selection of a network rollout strategy.

When the end-user is satisfied with the designated policies they may move to the next workflow stage, as illustrated in FIG. 11. A fourth interface panel 1100 is now presented within the set-up interface 650, adjacent to the update profile sequence 660, which depicts the 'current' stage as fourth stage 662 (Network rollout strategy). The fourth interface panel 1100 includes a fourth plurality of options 1102 corresponding generally to network rollout strategy rules 1130 ("How do you want to optimize your network usage?"), and more specifically includes options related to feature updates 1110 as well as quality and security updates 1120. As an example, the download of feature updates 1110 can be configured to be limited by a specified amount of data 1112 ("limit download size per day"), as selected by the user. In this case, the default is 5 GB, and can be modified via a sliding scale interactive tool. In other implementations, users may be able to enter the maximum amount of data downloaded daily manually, or through a presentation of other options. In addition, in some implementations, the download of feature updates 1110 can also be regulated or managed by specifying a period of time 1114 over which the updates must occur or be completed. In this case, the default is 10 days, and can be modified via a sliding scale interactive tool. In other implementations, users may be able to enter the interval for the download to complete manually, or through a presentation of other options.

Similarly, the download of quality and security updates 1120 can be configured to be limited by a specified amount of data 1122 ("limit download size per day"), as selected by the user. In this case, the default is 5 GB, and can be modified via a sliding scale interactive tool. In other implementations, users may be able to enter the maximum amount of data downloaded daily manually, or through a presentation of other options. Furthermore, in some implementations, the download of quality and security updates 1120 can also be regulated or managed by specifying a period of time 1124 over which the updates must occur or be completed. In this case, the default is also 10 days, and can be modified via a sliding scale interactive tool. In other implementations, users may be able to enter the interval for the download to complete manually, or through a presentation of other options.

For each of the two types of updates, it can be appreciated that adjustment of either of the two parameters (i.e., limit download size per day and the completion interval) can result in an automatic adjustment of the other parameter. In other words, if a user selects a daily download limit of 2 GB per day, the system may automatically increase the completion interval to accommodate the lower data limit. Conversely, if the user selects a completion interval of only 3 days, the system may automatically increase the daily download limit to accommodate the shorter period of time over which deployment of the updates must be completed.

Thus, as shown in FIG. 11, during creation of a recurring low risk devices update profile, an IT Administrator can choose different update profile network rollout strategies they wish to implement with their updates, including a maximum payload that can be downloaded per day (e.g., per NAT), the time in which the download should complete (after any initial deferral days; see FIG. 9), and/or a preferred download time window. In order to execute these preferences, the system is configured to receive inputs corresponding to (a) a maximum payload size that should not be exceeded per day/per NAT; (b) a maximum number of days to complete the deployment; (c) a download time window; (d) an estimated total downloaded payload size; (e) identification of DO capable devices; (f) the number and identification of distinct NATs; and/or (g) the number and type of distinct configurations.

Figure 12:
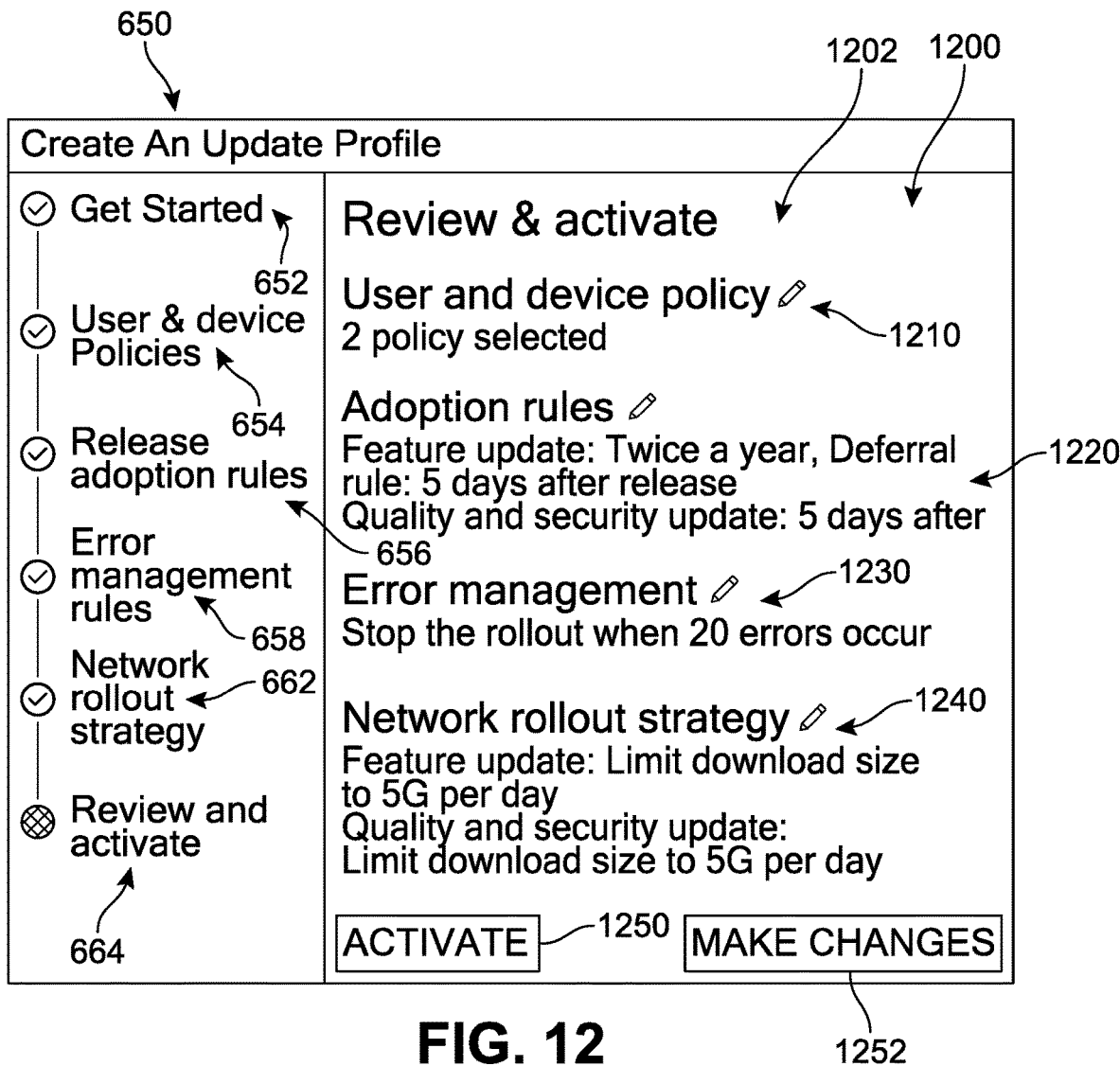
FIG. 12 is a representation of a device display with an implementation of an update profile creation interface for activating a customized update profile.

When the end-user is satisfied with the designated rollout strategies they may move to the next workflow stage, as illustrated in FIG. 12. A fifth interface panel 1200 is now presented within the set-up interface 650, adjacent to the update profile sequence 660, which depicts the 'current' stage as fifth stage 664 (Review and activate). In this case, the customization process is concluded, and a summary 1202 of the administrator's selections are listed for review. FIG. 12 represents a collection of user inputs following selections as shown in FIGS. 8-11, including a first selection 1210 (User and device policy) corresponding to the second stage 654, a second selection 1220 (Adoption rules) corresponding to the third stage 656, a third selection 1230 (Error management) corresponding to the fourth stage 658, and a fourth selection 1240 (Network rollout strategy) corresponding to the fifth stage 662. It can be seen that each item listed includes a 'pencil' symbol which can represent an actuatable option for that item to modify the configuration shown.

Once the administrator has inputted his or her preferences or selections as described above, the system can be configured to generate a profile for updates for the enterprise. FIGS. 13-16 depict one example of a low risk devices profile monitoring interface ("profile interface") 1300. In FIG. 13, the profile interface 1300 includes an overview message 1310 ("Low risk devices profile/Network rollout strategy/Feature update: limit download size to 5 G per day/Quality and security update: limit download size to 5 G per day") that summarizes for the administrator the profile attributes he or she has selected. As represented by an "EDIT" actuatable option adjacent to the overview message 1310, in some implementations, the system is configured to allow an administrator to re-define the throttle rules for the algorithm that will affect the rollout strategy for the target devices. For example, at this stage, an administrator can modify the number of days in which to complete the rollout, the maximum download bits per day, and/or the suitable time frame for the downloads. Indeed, in some implementations, these modifications to "throttle rules" of the rollout can be inputted while the rollout is in progress and automatically adjust subsequent rollout strategy. In other words, the management service can provide an adaptive model whereby new or updated information or selections can be incorporated into the existing strategy and used to automatically adjust settings to accommodate such changes.

Below the overview message 1310, a rollout detail interface panel ("rollout panel") 1302 includes a plurality of management tools, including a first tool 1320, a second tool 1330, a third tool 1340, a fourth tool 1350, and a fifth tool 1360. Each tool can be configured to display information and/or offer options related to the updates and the devices designated for deployment of the updates. In some implementations, the information can be updated in real-time to reflect the current deployment state. In FIG. 13, the first tool 1320 is a matrix corresponding to a payload/network distribution of the devices participating in the rollout. In this case, the matrix includes an X-axis representing network bandwidth (i.e., high, medium, low) and a Y-axis representing Payload level (i.e., high, medium, low). As an example, by reference to each density identifier 1322 (circles) it can be seen that of the 12,349 devices that are scheduled to be updated, approximately 40% are associated with a high payload and a high network bandwidth, approximately 27% are associated with a medium payload and a high network bandwidth, approximately 14% are associated with a low payload and a high network bandwidth, approximately 8% are associated with a low payload and a medium network bandwidth, approximately 5% are associated with a low payload and a low network bandwidth, and approximately 6% are associated with a high payload and a low network bandwidth.

Thus, in some implementations, IT administrators can view a 3×3 matrix distribution of all their (enterprise) devices based on the total payload each device (e.g., what needs to be downloaded from a CDN) vs. the device's network bandwidth. In another implementation, a 3×3 matrix distribution of all their (enterprise) devices can be shown based on the total payload each device versus the device's network cost. In some implementations, the system can provide density identifiers in each 'box' or category within the 3×3 matrix that signifies the number of devices 'bucketized' for the combination (e.g., payload vs network bandwidth). In one implementation, payload size may be computed using a data stream from the update provider. Furthermore, in some implementations, the first tool 1320 can be configured to more specifically categorize devices in the matrix by offering users a filter that can be applied to the displayed results. As one example, application of a filter can allow the user to view a 3×3 matrix distribution of all their (enterprise) devices based on the geolocation or region of each device and the device's network bandwidth or network cost.

In addition, the second tool 1330 is a bar chart corresponding to projected and realtime rollout rings for the devices. In FIG. 13, each bar 1332 corresponds to a ring (i.e., Ring 1 scheduled for deployment on April 25, followed by Ring 2, Ring 3, Ring 4, Ring 5, and Ring 6 scheduled for deployment on May 5). The rings represent a phase in which a certain number of designated devices will be updated. Because FIG. 13 illustrates the profile at a time prior to the initiation of the update process, only a representation of the projected devices that will be updated during each ring or phase is shown. In this example, each ring includes a decreasing number of devices from Ring 1 to Ring 6.

In different implementations, the system can be configured to receive additional inputs from the user during interactions with the second tool 1330. An administrator may navigate to portions of the bar chart for example and modify the ring allocation of devices. In response, the rollout algorithm automatically adapts to this change and provides the administrator with an updated rollout profile. In addition, administrators can view recommendations provided by the system for parameter input violations. In some implementations, the rollout strategy tool will display the following attributes: (a) the number of Rings; (b) the number of devices per Ring; (c) a total estimated payload or downloads per Ring; and/or (d) a total bandwidth saving(s) that can be obtained when using DO and/or BranchCache techniques.

Furthermore, the third tool 1340 is a general data display indicating rollout information and progress, such as the selected update window (10 days), an estimated finish time (May 5), the number of devices that have been updated (0 out of 12,349), and bits downloaded so far (0 bits). The fourth tool 1350 is configured to present alerts for particular events of note that may occur during the rollout, and the fifth tool 1360 is configured to present any potentially helpful recommendations to the administrator (e.g., "50 devices can benefit from delivery optimization"). As a general matter, devices configured with delivery optimization (DO) facilitate a reduction in bandwidth by enabling the device(s) to obtain portions of updates from other peers on the enterprise network that have already downloaded the content, thereby reducing the amount of network traffic generated due to updates. Thus, a device configured with DO has access to a peer-to-peer client update service tool for reducing bandwidth consumption.

As an example of an interaction event between the administrator and the management tools of the rollout panel 1302, FIG. 14 depicts a mouse cursor 'hover' over a first density identifier 1422, an appearance of a segment of each of the bars 1332 is also modified to represent the number of devices in each ring that correspond to classification by the first density identifier 1422. Thus, in some implementations, the system can include provisions for enabling a user to view the distribution of their devices across rings. Such an option can be implemented prior to the rollout, as shown in FIG. 14, or while the rollout is in progress. In addition, it should be understood that similar mechanisms are provided by navigation to other management tools described herein. In some examples, movement of the mouse cursor to other portions of the profile interface 1300 can trigger other changes in appearance or presentation of information corresponding to the specific area that has been selected for details.

Figure 15:
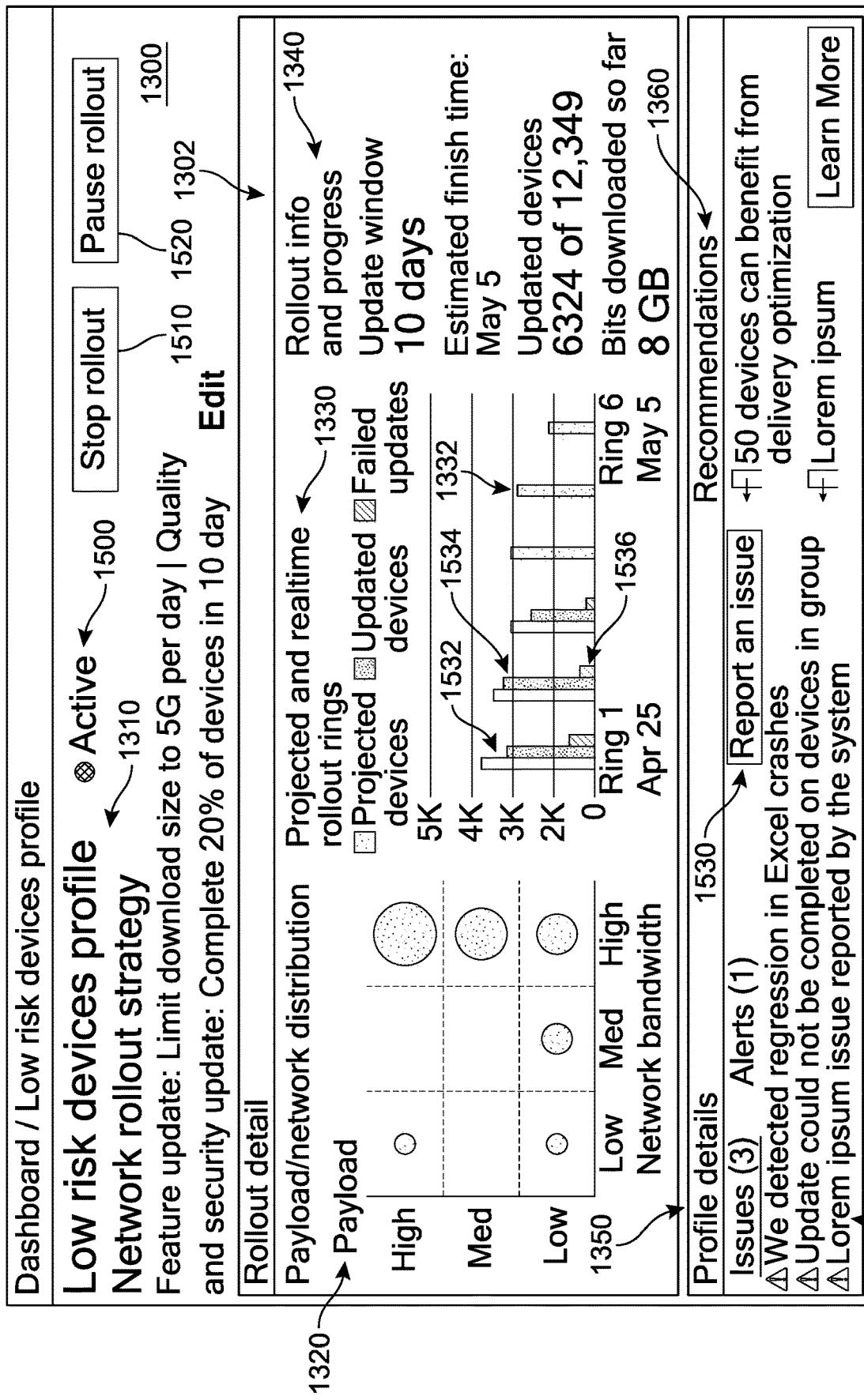
FIGS. 15 and 16 are representations of a device display with an implementation of an update profile management interface during an update rollout.
Figure 16:
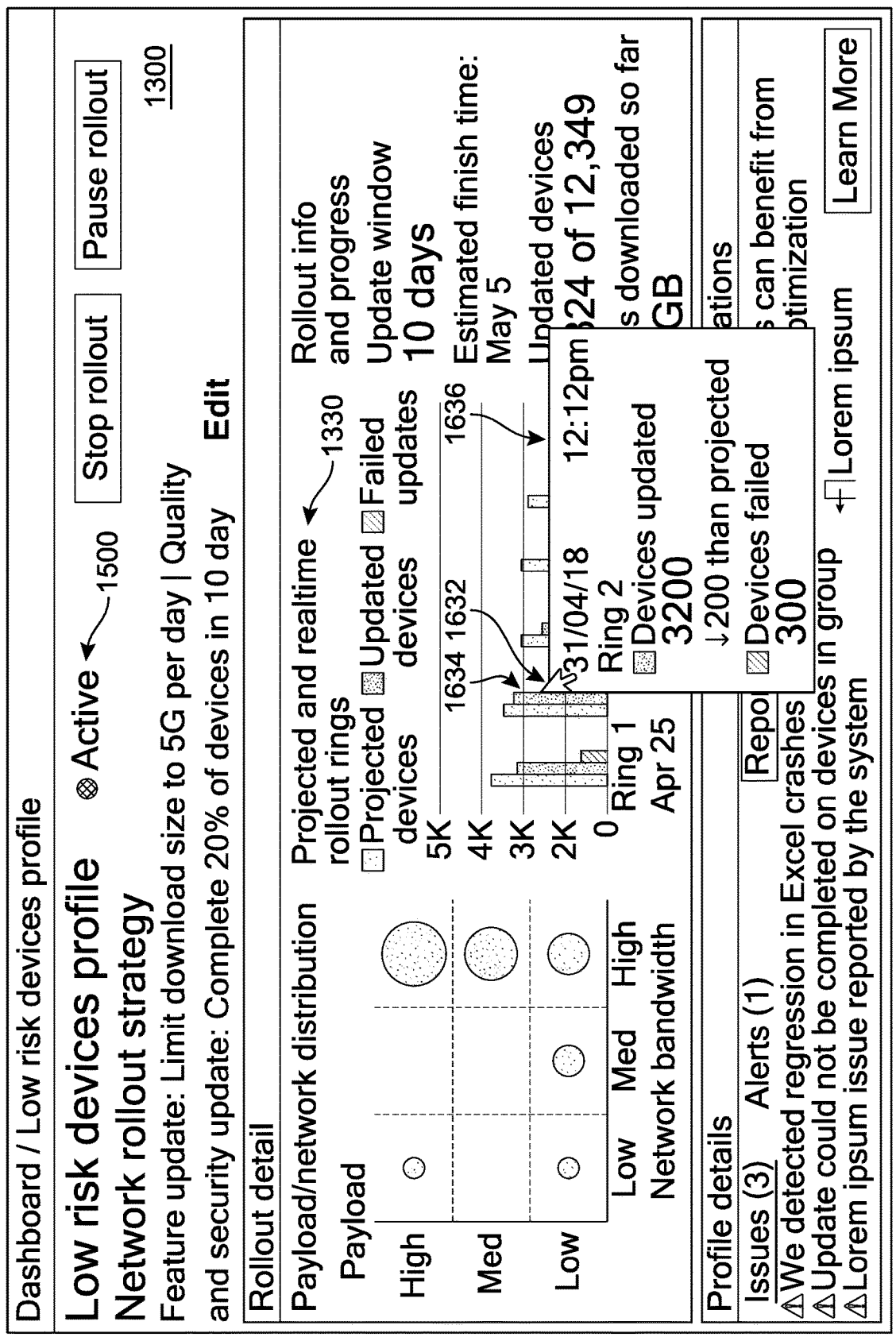

While FIGS. 13 and 14 depicted an example of the profile interface 1300 prior to the initiation of the rollout, FIGS. 15 and 16 depict an example of the profile interface 1300 after the rollout has begun. In FIG. 15, a rollout status 1500 is shown to be "Active". Additional options for controlling the rollout have also been provided, including a first option 1510 for terminating the rollout and a second option 1520 for pausing the rollout. Furthermore, as time passes, one or more issue notifications 1552 can be presented (e.g., "We detected regression in Excel crashes/Update could not be complete on devices in group_HR01 . . . ". A reporting option 1530 is also now provided to allow users to submit their own issues.

In response the ongoing rollout, the projected and realtime rollout rings representation (second tool 1330) and/or rollout information and progress (third tool 1340) can also be continuously updated. In FIG. 15, the second tool 1330 now includes an additional set of three bars representing updated devices in each of the first three rings, where these new bars are darker in shading that the original (projected devices) set, as well as another set of three bars representing devices in which updates were attempted and failed. For example, Ring 1 now includes a first bar 1532, a second bar 1534, and a third bar 1536, where the first bar 1532 indicates the projected number of devices to be updated in Ring 1, the second bar 1534 indicates the number of devices within that set that have now been updated, and the third bar 1536 indicates the number of devices within that set for which updates failed. Similarly, the third tool 1340 has increased the number of updated devices to 6324 of 12,349.

As another example of an interaction event between the administrator and the management tools of the rollout panel 1302, FIG. 16 depicts a mouse cursor 'hover' 1632 over a second bar 1634 corresponding to Ring 2 of the rollout. In response, a pop-up window 1636 is presented in which further details about the devices of Ring 2 are shown. The pop-up window can include, for example, a date (31/04/18) and time (12:12 pm), as well as more specifics regarding the chosen ring. In this example, Ring 2 is shown as having 3200 devices updated, as well as an analysis that this is 200 less than the number that was projected to be updated at this time, and the number of devices that failed to update (here, 300).

Thus, as shown in FIGS. 15 and 16, in some implementations, the system can be configured to present real-time progress of the rollout, as well as a comparison of the actual progress against the predicted rollout progression. Similarly, the tools are configured to permit administrators to view devices grouped by deployment errors, to view the deployment errors, and also to look-up the actual machines which failed to update. This can greatly facilitate the process by which an administrator may attempt to implement remediation measures for error-prone devices or devices that otherwise failed to update.

Figure 17:
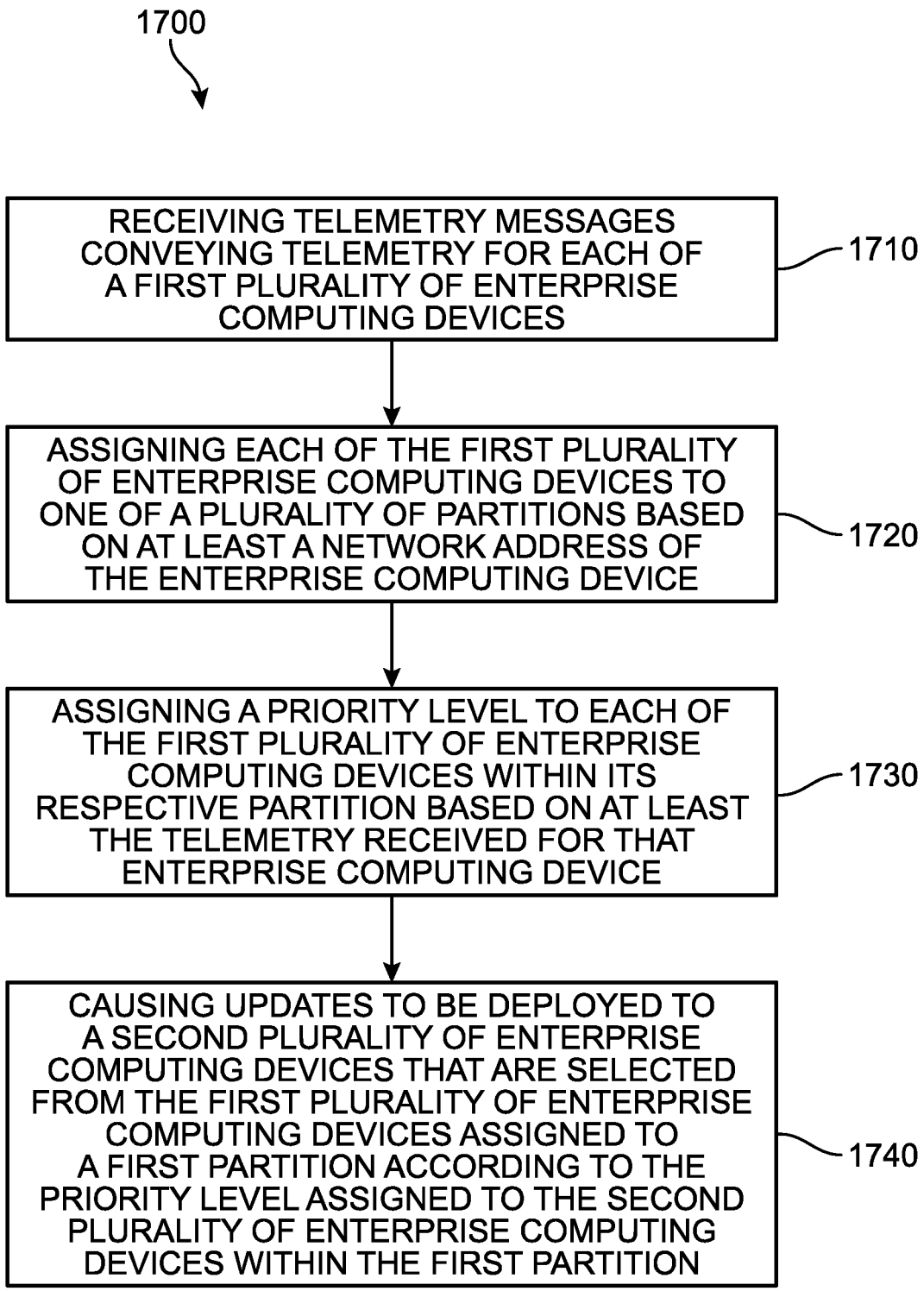
FIG. 17 is a flow diagram illustrating an implementation of a process for managing updates across an enterprise computing environment.

FIG. 17 is a flow chart illustrating an implementation of a method 1700 of managing updates for enterprise computing devices. In the example of FIG. 17, a first step 1710 includes receiving a first plurality of telemetry messages over a communication network. In this case, each telemetry message of the first plurality of telemetry messages conveys telemetry for each of a first plurality of enterprise computing devices. A second step 1720 includes assigning each of the first plurality of enterprise computing devices to one of a plurality of partitions based on at least a network address associated with the enterprise computing device. For example, the plurality of partitions include a first partition. A third step 1730 includes assigning a priority level to each of the first plurality of enterprise computing devices within its respective one of the plurality of partitions based on at least a telemetry message received for that enterprise computing device. A fourth step 1740 includes causing, as part of a rollout of an update to the first plurality of enterprise computing devices, the update to be deployed to a second plurality of enterprise computing devices. In such cases, the second plurality of enterprise computing devices are selected from the first plurality of enterprise computing devices assigned to the first partition according to the priority level assigned to the second plurality of enterprise computing devices within the first partition.

In other implementations, additional steps may be included. For example, in some implementations, the assigning a priority level to each of the first plurality of enterprise computing devices includes prioritizing a third plurality of enterprise computing devices configured with delivery optimization higher than devices without delivery optimization, based on the first plurality of telemetry messages indicating each of the third plurality of enterprise computing devices is configured with delivery optimization.

In some implementations, the method may also include steps of receiving a first administrator input indicating an error threshold, receiving error indications from a first number of enterprise computing devices included in the first plurality of enterprise computing devices, and interrupting the rollout in response to the first number meeting the received error threshold. As another example, the method may include receiving a first administrator input indicating a first network data transfer limit for a period of time, where the selection of the second plurality of enterprise computing devices is based on the received first network data transfer limit. In one implementation, the method can also involve causing, as part of the rollout of the update and prior to receiving the first administrator input, the update to be deployed to a third plurality of enterprise computing devices. In such cases, the third plurality of enterprise computing devices can be selected from the first plurality of enterprise computing devices assigned to the first partition based on a second network data transfer limit that is different than the first network data transfer limit.

In another example, the method may include receiving a first administrator input indicating a deadline for completion of the rollout, where the selection of the second plurality of enterprise computing devices is further based on the received deadline. In some implementations, the method also includes receiving a first administrator input indicating a deferral period for deferring update deployments, determining that the update was released at a first time, and initiating the rollout of the update following the first time once the deferral period has elapsed.

In addition, in some implementations, the method can further include a step of receiving a second plurality of telemetry messages over the communication network, where each telemetry message of the second plurality of telemetry messages conveys telemetry for each of a third plurality of enterprise computing devices not included in the first plurality of enterprise computing devices. The method can also include selecting the first plurality of enterprise computing devices from a fourth plurality of enterprise computing devices based on at least the first plurality of telemetry messages and the second plurality of telemetry messages, where the fourth plurality of enterprise computing devices consists of the first plurality of enterprise computing devices and the third plurality of enterprise computing devices.

Furthermore, the method can include, for each of the first plurality of enterprise computing devices, selecting one of a plurality of packages, each configured to provide the update. In such cases, the assigning each of the first plurality of enterprise computing devices to one of a plurality of partitions may be further based on the package selected for each enterprise computing device. In another implementation, the assigning a priority level to each of the first plurality of enterprise computing devices includes prioritizing a third plurality of enterprise computing devices according to an amount of user activity indicated by the first plurality of telemetry messages.

The detailed examples of systems, devices, and techniques described in connection with FIGS. 1-17 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-17 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 18:
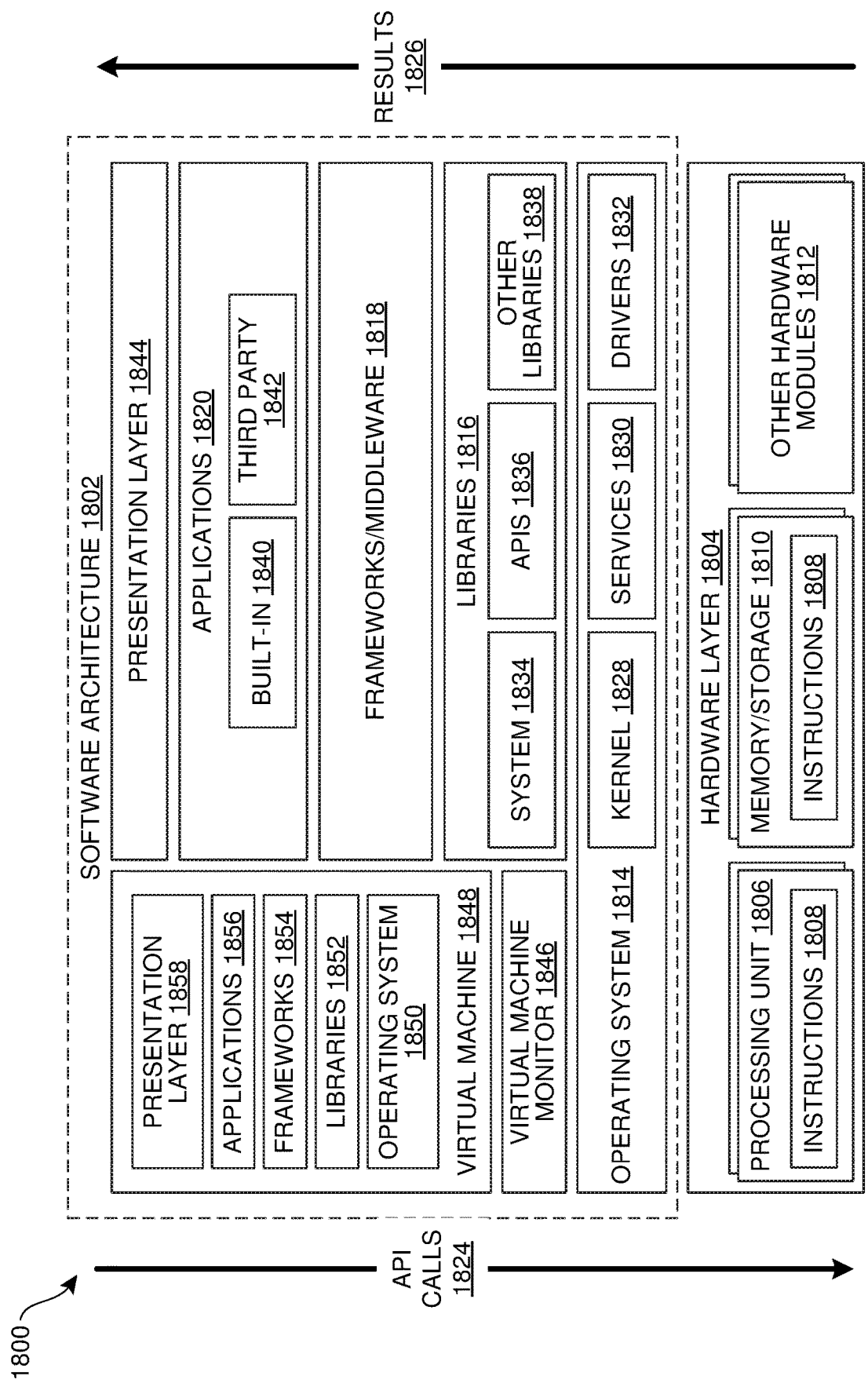
FIG. 18 is a block diagram of an example computing device, which may be used to provide implementations of the mechanisms described herein.

FIG. 18 is a block diagram 1800 illustrating an example software architecture 1802, various portions of which may be used in conjunction with various hardware architectures herein described, which may implement any of the above-described features. FIG. 18 is a non-limiting example of a software architecture and it will be appreciated that many other architectures may be implemented to facilitate the functionality described herein. The software architecture 1802 may execute on hardware that includes, among other things, document storage, processors, memory, and input/output (I/O) components. A representative hardware layer 1804 is illustrated and can represent, a computing device. The representative hardware layer 1804 includes a processing unit 1806 and associated executable instructions 1808. The executable instructions 1808 represent executable instructions of the software architecture 1802, including implementation of the methods, modules and so forth described herein. The hardware layer 1804 also includes a memory/storage 1810, which also includes the executable instructions 1808 and accompanying data. The hardware layer 1804 may also include other hardware modules 1812. Instructions 1808 held by processing unit 1808 may be portions of instructions 1808 held by the memory/storage 1810.

The example software architecture 1802 may be conceptualized as layers, each providing various functionality. For example, the software architecture 1802 may include layers and components such as an operating system (OS) 1814, libraries 1816, frameworks 1818, applications 1820, and a presentation layer 1844. Operationally, the applications 1820 and/or other components within the layers may invoke API calls 1824 to other layers and receive corresponding results 1826. The layers illustrated are representative in nature and other software architectures may include additional or different layers. For example, some mobile or special purpose operating systems may not provide the frameworks/middleware 1818.

The OS 1814 may manage hardware resources and provide common services. The OS 1814 may include, for example, a kernel 1828, services 1830, and drivers 1832. The kernel 1828 may act as an abstraction layer between the hardware layer 1804 and other software layers. For example, the kernel 1828 may be responsible for memory management, processor management (for example, scheduling), component management, networking, security settings, and so on. The services 1830 may provide other common services for the other software layers. The drivers 1832 may be responsible for controlling or interfacing with the underlying hardware layer 1804. For instance, the drivers 1832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1816 may provide a common infrastructure that may be used by the applications 1820 and/or other components and/or layers. The libraries 1816 typically provide functionality for use by other software modules to perform tasks, rather than rather than interacting directly with the OS 1814. The libraries 1816 may include system libraries 1834 (for example, C standard library) that may provide functions such as memory allocation, string manipulation, file operations. In addition, the libraries 1816 may include API libraries 1836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1816 may also include a wide variety of other libraries 1838 to provide many functions for applications 1820 and other software modules.

The frameworks 1818 (also sometimes referred to as middleware) provide a higher-level common infrastructure that may be used by the applications 1820 and/or other software modules. For example, the frameworks 1818 may provide various graphic user interface (GUI) functions, high-level resource management, or high-level location services. The frameworks 1818 may provide a broad spectrum of other APIs for applications 1820 and/or other software modules.

The applications 1820 include built-in applications 1840 and/or third-party applications 1842. Examples of built-in applications 1840 may include, but are not limited to, a contacts application, a browser application, a location application, a media application, a messaging application, and/or a game application. Third-party applications 1842 may include any applications developed by an entity other than the vendor of the particular platform. The applications 1820 may use functions available via OS 1814, libraries 1816, frameworks 1818, and presentation layer 1844 to create user interfaces to interact with users.

Some software architectures use virtual machines, as illustrated by a virtual machine 1848. The virtual machine 1848 provides an execution environment where applications/modules can execute as if they were executing on a hardware machine (such as the machine 1000 of FIG. 10, for example). The virtual machine 1848 may be hosted by a host OS (for example, OS 1814) or hypervisor, and may have a virtual machine monitor 1846 which manages operation of the virtual machine 1848 and interoperation with the host operating system. A software architecture, which may be different from software architecture 1802 outside of the virtual machine, executes within the virtual machine 1848 such as an OS 1850, libraries 1852, frameworks 1854, applications 1856, and/or a presentation layer 1858.

Figure 19:
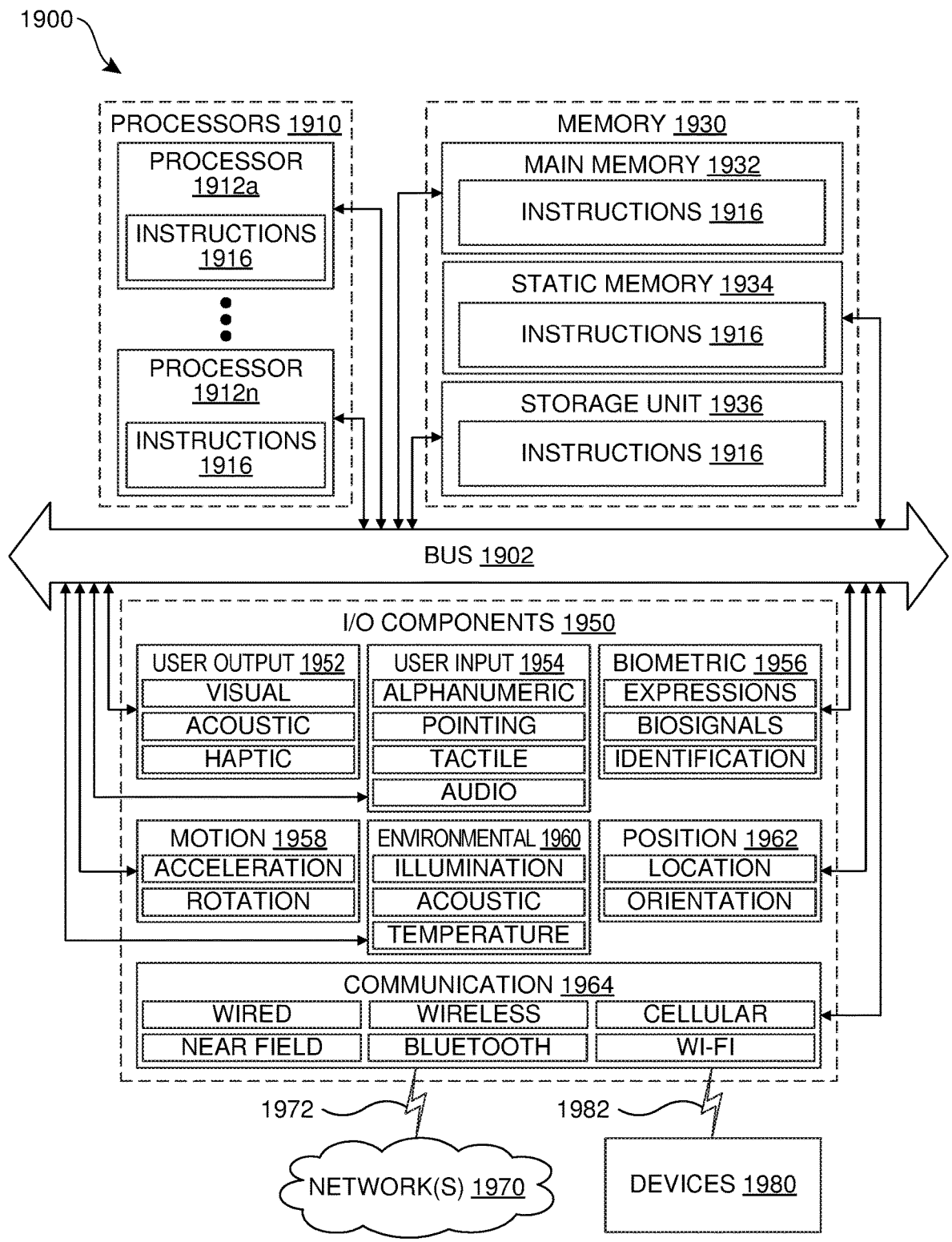
FIG. 19 is a block diagram illustrating components of an example machine configured to read instructions from a machine-readable medium.

FIG. 19 is a block diagram illustrating components of an example machine 1900 configured to read instructions from a machine-readable medium (for example, a machine-readable storage medium) and perform any of the features described herein. It is to be understood that the phrase "machine-readable medium" and "computer-readable medium" are interchangeable in their usage herein. The example machine 1900 is in a form of a computer system, within which instructions 1916 (for example, in the form of software components) for causing the machine 1900 to perform any of the features described herein may be executed. As such, the instructions 1916 may be used to implement modules or components described herein. The instructions 1916 cause unprogrammed and/or unconfigured machine 1900 to operate as a particular machine configured to carry out the described features. The machine 1900 may be configured to operate as a standalone device or may be coupled (for example, networked) to other machines. In a networked deployment, the machine 1900 may operate in the capacity of a server machine or a client machine in a server-client network environment, or as a node in a peer-to-peer or distributed network environment. Machine 1900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1900 is illustrated, the term "machine" includes a collection of machines that individually or jointly execute the instructions 1916.

The machine 1900 may include processors 1910, memory 1930, and I/O components 1950, which may be communicatively coupled via, for example, a bus 1902. The bus 1902 may include multiple buses coupling various elements of machine 1900 via various bus technologies and protocols. In an example, the processors 1910 (including, for example, a central processing unit (CPU), a graphics processing unit (GPU), a digital signal processor (DSP), an ASIC, or a suitable combination thereof) may include one or more processors 1912a to 1912n that may execute the instructions 1916 and process data. In some examples, one or more processors 1910 may execute instructions provided or identified by one or more other processors 1910. The term "processor" includes a multi-core processor including cores that may execute instructions contemporaneously. Although FIG. 19 shows multiple processors, the machine 1900 may include a single processor with a single core, a single processor with multiple cores (for example, a multi-core processor), multiple processors each with a single core, multiple processors each with multiple cores, or any combination thereof. In some examples, the machine 1900 may include multiple processors distributed among multiple machines.

The memory/storage 1930 may include a main memory 1932, a static memory 1934, or other memory, and a storage unit 1936, both accessible to the processors 1910 such as via the bus 1902. The storage unit 1936 and memory 1932, 1934 store instructions 1916 embodying any one or more of the functions described herein. The memory/storage 1930 may also store temporary, intermediate, and/or long-term data for processors 1910. The instructions 1916 may also reside, completely or partially, within the memory 1932, 1934, within the storage unit 1936, within at least one of the processors 1910 (for example, within a command buffer or cache memory), within memory at least one of I/O components 1950, or any suitable combination thereof, during execution thereof. Accordingly, the memory 1932, 1934, the storage unit 1936, memory in processors 1910, and memory in I/O components 1950 are examples of machine-readable medium.

As used herein, "machine-readable medium" refers to a device able to temporarily or permanently store instructions and data that cause machine 1900 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1916) for execution by a machine 1900 such that the instructions, when executed by one or more processors 1910 of the machine 1900, cause the machine 1900 to perform and one or more of the features described herein. Accordingly, a "machine-readable medium" may refer to a single storage device, as well as "cloud-based" storage systems or storage networks that include multiple storage apparatus or devices.

The I/O components 1950 may include a wide variety of hardware components adapted to receive input, provide output, produce output, transmit information, exchange information, capture measurements, and so on. The specific I/O components 1950 included in a particular machine will depend on the type and/or function of the machine. For example, mobile devices such as mobile phones may include a touch input device, whereas a headless server or IoT device may not include such a touch input device. The particular examples of I/O components illustrated in FIG. 19 are in no way limiting, and other types of components may be included in machine 1900. The grouping of I/O components 1950 are merely for simplifying this discussion, and the grouping is in no way limiting. In various examples, the I/O components 1950 may include user output components 1952 and user input components 1954. User output components 1952 may include, for example, display components for displaying information (for example, a liquid crystal display (LCD) or a projector), acoustic components (for example, speakers), haptic components (for example, a vibratory motor or force-feedback device), and/or other signal generators. User input components 1954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1950 may include biometric components 1956 and/or position components 1962, among a wide array of other environmental sensor components. The biometric components 1956 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1962 may include, for example, location sensors (for example, a Global Position System (GPS) receiver), altitude sensors (for example, an air pressure sensor from which altitude may be derived), and/or orientation sensors (for example, magnetometers).

The I/O components 1950 may include communication components 1964, implementing a wide variety of technologies operable to couple the machine 1900 to network(s) 1970 and/or device(s) 1980 via respective communicative couplings 1972 and 1982. The communication components 1964 may include one or more network interface components or other suitable devices to interface with the network(s) 1970. The communication components 1964 may include, for example, components adapted to provide wired communication, wireless communication, cellular communication, Near Field Communication (NFC), Bluetooth communication, Wi-Fi, and/or communication via other modalities. The device(s) 1980 may include other machines or various peripheral devices (for example, coupled via USB).

In some examples, the communication components 1964 may detect identifiers or include components adapted to detect identifiers. For example, the communication components 1964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1962, such as, but not limited to, geo-location via Internet Protocol (IP) address, location via Wi-Fi, cellular, NFC, Bluetooth, or other wireless station identification and/or signal triangulation.

Furthermore, implementations of the present disclosure can make use of any of the features, systems, components, devices, and methods described in U.S. Patent Publication Number 2018/0300180 to Shepard et al., published Oct. 18, 2018 and titled "Resource deployment using device analytics"; U.S. Patent Publication Number 2006/0130037 to Mackay et al., published Jun. 15, 2006 and titled "Method and system for downloading updates"; U.S. Pat. No. 7,987,459 to Chow et al., granted Jul. 26, 2011 and titled "Application programming interface for identifying, downloading and installing applicable software updates"; U.S. Pat. No. 8,701,102 to Appiah et al., granted Apr. 15, 2014 and titled "Techniques for automatic software provisioning"; U.S. Pat. No. 7,676,448 to Henderson et al., granted Mar. 9, 2010 and titled "Controlling installation update behaviors on a client computer"; U.S. Pat. No. 9,645,809 to Cohen et al., granted May 9, 2017 and titled "Updating software components through online stores"; U.S. Patent Publication Number 2011/0289499 to Haubold et al., published Nov. 24, 2011 and titled "Techniques to automatically update software applications"; U.S. Patent Publication Number 2012/0130725 to Cooper et al., published May 24, 2012 and titled "Automatic upgrade scheduling"; and U.S. Patent Publication Number 2016/0117161 to Parthasarathy et al., published Apr. 28, 2016 and titled "Installing and updating software systems"; the disclosures of which are each herein incorporated by reference in their entirety.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. An update management system for enterprise computing devices, the system comprising:
   a processor; and
   computer readable media including instructions which, when executed by the processor, cause the processor to:
      receive a first plurality of telemetry messages over a communication network, each telemetry message of the first plurality of telemetry messages conveying telemetry for each of a first plurality of enterprise computing devices;
      assign each of the first plurality of enterprise computing devices to one of a plurality of partitions based on at least a network address associated with the enterprise computing device, the plurality of partitions including a first partition;
      assign a priority level to each of the first plurality of enterprise computing devices within its respective one of the plurality of partitions based on at least a telemetry message received for that enterprise computing device, wherein assigning of a priority level to each of the first plurality of enterprise computing devices includes prioritizing a third plurality of enterprise computing devices configured with delivery optimization higher than devices without delivery optimization, based on the first plurality of telemetry messages indicating each of the third plurality of enterprise computing devices is configured with delivery optimization; and
      cause, as part of a rollout of an update to the first plurality of enterprise computing devices, the update to be deployed to a second plurality of enterprise computing devices, wherein the second plurality of enterprise computing devices are selected from the first plurality of enterprise computing devices assigned to the first partition according to the priority level assigned to the second plurality of enterprise computing devices within the first partition.

2. The system of claim 1, wherein the instructions further cause the processor to:
   receive a first administrator input indicating an error threshold;
   receive error indications from a first number of enterprise computing devices included in the first plurality of enterprise computing devices; and
   interrupt the rollout in response to the first number meeting the received error threshold.

3. The system of claim 1, wherein the instructions further cause the processor to receive a first administrator input indicating a first network data transfer limit for a period of time, wherein the selection of the second plurality of enterprise computing devices is based on the received first network data transfer limit.

4. The system of claim 1, wherein the instructions further cause the processor to receive a first administrator input indicating a deadline for completion of the rollout, wherein the selection of the second plurality of enterprise computing devices is further based on the received deadline.

5. The system of claim 1, wherein the instructions further cause the processor to:
   receive a first administrator input indicating a deferral period for deferring update deployments;
   determine that the update was released at a first time; and
   initiate the rollout of the update following the first time once the deferral period has elapsed.

6. The system of claim 1, wherein the instructions further cause the processor to:
   receive a second plurality of telemetry messages over the communication network, each telemetry message of the second plurality of telemetry messages conveying telemetry for each of a third plurality of enterprise computing devices not included in the first plurality of enterprise computing devices; and
   select the first plurality of enterprise computing devices from a fourth plurality of enterprise computing devices based on at least the first plurality of telemetry messages and the second plurality of telemetry messages, wherein the fourth plurality of enterprise computing devices consists of the first plurality of enterprise computing devices and the third plurality of enterprise computing devices.

7. The system of claim 1, wherein the instructions further cause the processor to, for each of the first plurality of enterprise computing devices, select one of a plurality of packages, each configured to provide the update, wherein the assigning each of the first plurality of enterprise computing devices to one of a plurality of partitions is further based on the package selected for each enterprise computing device.

8. An update management system for enterprise computing devices, the system comprising:
a processor; and
computer readable media including instructions which, when executed by the processor, cause the processor to:
receive a first plurality of telemetry messages over a communication network, each telemetry message of the first plurality of telemetry messages conveying telemetry for each of a first plurality of enterprise computing devices;
assign each of the first plurality of enterprise computing devices to one of a plurality of partitions based on at least a network address associated with the enterprise computing device, the plurality of partitions including a first partition;
assign a priority level to each of the first plurality of enterprise computing devices within its respective one of the plurality of partitions based on at least a telemetry message received for that enterprise computing device;
receive a first administrator input indicating a first network data transfer limit for a period of time;
cause, as part of a rollout of an update to the first plurality of enterprise computing devices, the update to be deployed to a second plurality of enterprise computing devices, wherein the second plurality of enterprise computing devices are selected from the first plurality of enterprise computing devices assigned to the first partition according to the priority level assigned to the second plurality of enterprise computing devices within the first partition, wherein the selection of the second plurality of enterprise computing devices is based on the received first network data transfer limit; and
cause, as part of the rollout of the update and prior to receiving the first administrator input, the update to be deployed to a third plurality of enterprise computing devices, wherein the third plurality of enterprise computing devices are selected from the first plurality of enterprise computing devices assigned to the first partition based on a second network data transfer limit that is different than the first network data transfer limit.

9. A method for managing updates for an enterprise computing environment, the method comprising:
receiving a first plurality of telemetry messages over a communication network, each telemetry message of the first plurality of telemetry messages conveying telemetry for each of a first plurality of enterprise computing devices;
assigning each of the first plurality of enterprise computing devices to one of a plurality of partitions based on at least a network address associated with the enterprise computing device, the plurality of partitions including a first partition;
assigning a priority level to each of the first plurality of enterprise computing devices within its respective one of the plurality of partitions based on at least a telemetry message received for that enterprise computing device, wherein the assigning a priority level to each of the first plurality of enterprise computing devices includes prioritizing a third plurality of enterprise computing devices configured with delivery optimization higher than devices without delivery optimization, based on the first plurality of telemetry messages indicating each of the third plurality of enterprise computing devices is configured with delivery optimization; and
causing, as part of a rollout of an update to the first plurality of enterprise computing devices, the update to be deployed to a second plurality of enterprise computing devices, wherein the second plurality of enterprise computing devices are selected from the first plurality of enterprise computing devices assigned to the first partition according to the priority level assigned to the second plurality of enterprise computing devices within the first partition.

10. The method of claim 9, further comprising:
receiving a first administrator input indicating an error threshold;
receiving error indications from a first number of enterprise computing devices included in the first plurality of enterprise computing devices; and
interrupting the rollout in response to the first number meeting the received error threshold.

11. The method of claim 9, further comprising receiving a first administrator input indicating a first network data transfer limit for a period of time, wherein the selection of the second plurality of enterprise computing devices is based on the received first network data transfer limit.

12. The method of claim 9, further comprising receiving a first administrator input indicating a deadline for completion of the rollout, wherein the selection of the second plurality of enterprise computing devices is further based on the received deadline.

13. The method of claim 9, further comprising:
receiving a first administrator input indicating a deferral period for deferring update deployments;
determining that the update was released at a first time; and
initiating the rollout of the update following the first time once the deferral period has elapsed.

14. The method of claim 9, further comprising:
receiving a second plurality of telemetry messages over the communication network, each telemetry message of the second plurality of telemetry messages conveying telemetry for each of a third plurality of enterprise computing devices not included in the first plurality of enterprise computing devices; and
selecting the first plurality of enterprise computing devices from a fourth plurality of enterprise computing devices based on at least the first plurality of telemetry messages and the second plurality of telemetry messages,
wherein the fourth plurality of enterprise computing devices consists of the first plurality of enterprise computing devices and the third plurality of enterprise computing devices.

15. The method of claim 9, further comprising for each of the first plurality of enterprise computing devices, selecting one of a plurality of packages, each configured to provide the update, wherein the assigning each of the first plurality of enterprise computing devices to one of a plurality of partitions is further based on the package selected for each enterprise computing device.

16. The method of claim 9, wherein the assigning a priority level to each of the first plurality of enterprise computing devices includes prioritizing a third plurality of enterprise computing devices according to an amount of user activity indicated by the first plurality of telemetry messages.

17. Non-transitory machine-readable media including instructions, which when executed by a processor, cause the processor to perform the method of claim 9.

18. A method for managing updates for an enterprise computing environment, the method comprising:
  receiving a first plurality of telemetry messages over a communication network, each telemetry message of the first plurality of telemetry messages conveying telemetry for each of a first plurality of enterprise computing devices;
  assigning each of the first plurality of enterprise computing devices to one of a plurality of partitions based on at least a network address associated with the enterprise computing device, the plurality of partitions including a first partition;
  assigning a priority level to each of the first plurality of enterprise computing devices within its respective one of the plurality of partitions based on at least a telemetry message received for that enterprise computing device;
  receiving a first administrator input indicating a first network data transfer limit for a period of time;
  causing, as part of a rollout of an update to the first plurality of enterprise computing devices, the update to be deployed to a second plurality of enterprise computing devices, wherein the second plurality of enterprise computing devices are selected from the first plurality of enterprise computing devices assigned to the first partition according to the priority level assigned to the second plurality of enterprise computing devices within the first partition, and wherein the selection of the second plurality of enterprise computing devices is based on the received first network data transfer limit; and
  causing, as part of the rollout of the update and prior to receiving the first administrator input, the update to be deployed to a third plurality of enterprise computing devices, wherein the third plurality of enterprise computing devices are selected from the first plurality of enterprise computing devices assigned to the first partition based on a second network data transfer limit that is different than the first network data transfer limit.

* * * * *